United States Patent
Midorogi et al.

(10) Patent No.: US 9,063,913 B2
(45) Date of Patent: Jun. 23, 2015

(54) EXPRESSION INPUT APPARATUS, EXPRESSION DISPLAY APPARATUS, EXPRESSION INPUT METHOD, EXPRESSION DISPLAY METHOD, RECORDING MEDIUM STORING EXPRESSION INPUT CONTROL PROGRAM, AND RECORDING MEDIUM STORING EXPRESSION DISPLAY CONTROL PROGRAM

(75) Inventors: Satomi Midorogi, Iruma (JP); Takashi Kojo, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 275 days.

(21) Appl. No.: 13/528,565

(22) Filed: Jun. 20, 2012

(65) Prior Publication Data
US 2012/0327102 A1 Dec. 27, 2012

(30) Foreign Application Priority Data

Jun. 23, 2011 (JP) .................................. 2011-139034
Nov. 18, 2011 (JP) .................................. 2011-252160
Dec. 27, 2011 (JP) .................................. 2011-284626

(51) Int. Cl.
*G06F 17/21* (2006.01)
*G06F 17/24* (2006.01)

(52) U.S. Cl.
CPC ............ *G06F 17/215* (2013.01); *G06F 17/241* (2013.01)

(58) Field of Classification Search
CPC ........ G06T 11/001; G06T 11/60; G06G 5/06; G06F 3/0481; G06F 17/218; H04N 5/272
See application file for complete search history.

(56) References Cited

U.S. PATENT DOCUMENTS

| 5,067,102 | A | 11/1991 | Eisenstein |
| 5,901,074 | A * | 5/1999 | Nakano et al. ................ 708/142 |
| 6,610,106 | B1 * | 8/2003 | Jenks ............................ 715/205 |

FOREIGN PATENT DOCUMENTS

| JP | 4-252351 A | 9/1992 |
| JP | 2011-175400 A | 9/2011 |

OTHER PUBLICATIONS

Extended European Search Report(EESR)dated Sep. 2, 2013 (in English) in counterpart European Application No. 12172357.1.
Partial European Search Report (PESR) dated May 8, 2013 (in English) issued in counterpart European Application No. 12172357.1.
Anonymous: "Clipboard Magic", CFS Program Review, Jun. 23, 1998, XP055061516: pp. 1 & 2 (in English).
Nuyts A.: "EPOQUE Search and Viewer tools at the European Patent Office", Proceedings of 2000 Chemical Information Conference, Oct. 22, 2000, XP009003259, pp. 47-56 (in English).

* cited by examiner

*Primary Examiner* — Antonio A Caschera
(74) *Attorney, Agent, or Firm* — Holtz, Holtz, Goodman & Chick PC

(57) ABSTRACT

An expression input apparatus includes: an expression input unit; an expression display unit; an expression/color specifying unit that specifies an expression portion in expressions displayed on the expression display unit and that specifies a color among a plurality of colors; an expression/color storage unit that stores the specified expression portion and the specified color in association with each other; a highlighting control unit that highlights the expression portion with the color; a color/position specifying unit that specifies the color stored in association with the expression portion, and that specifies a position at which a new expression portion is to be inputted; and a pasting unit that pastes the expression portion on the specified position and highlights the pasted expression portion with the specified color.

13 Claims, 20 Drawing Sheets

FIG. 3

| No. | COLOR | EXPRESSION PORTION |
|---|---|---|
| 1 | | |
| 2 | | |
| 3 | | |
| 4 | | |
| 5 | | 2y+1 |
| 6 | | |
| 7 | | |
| 8 | | |
| 9 | | |
| 10 | | |
| ⋮ | ⋮ | ⋮ |

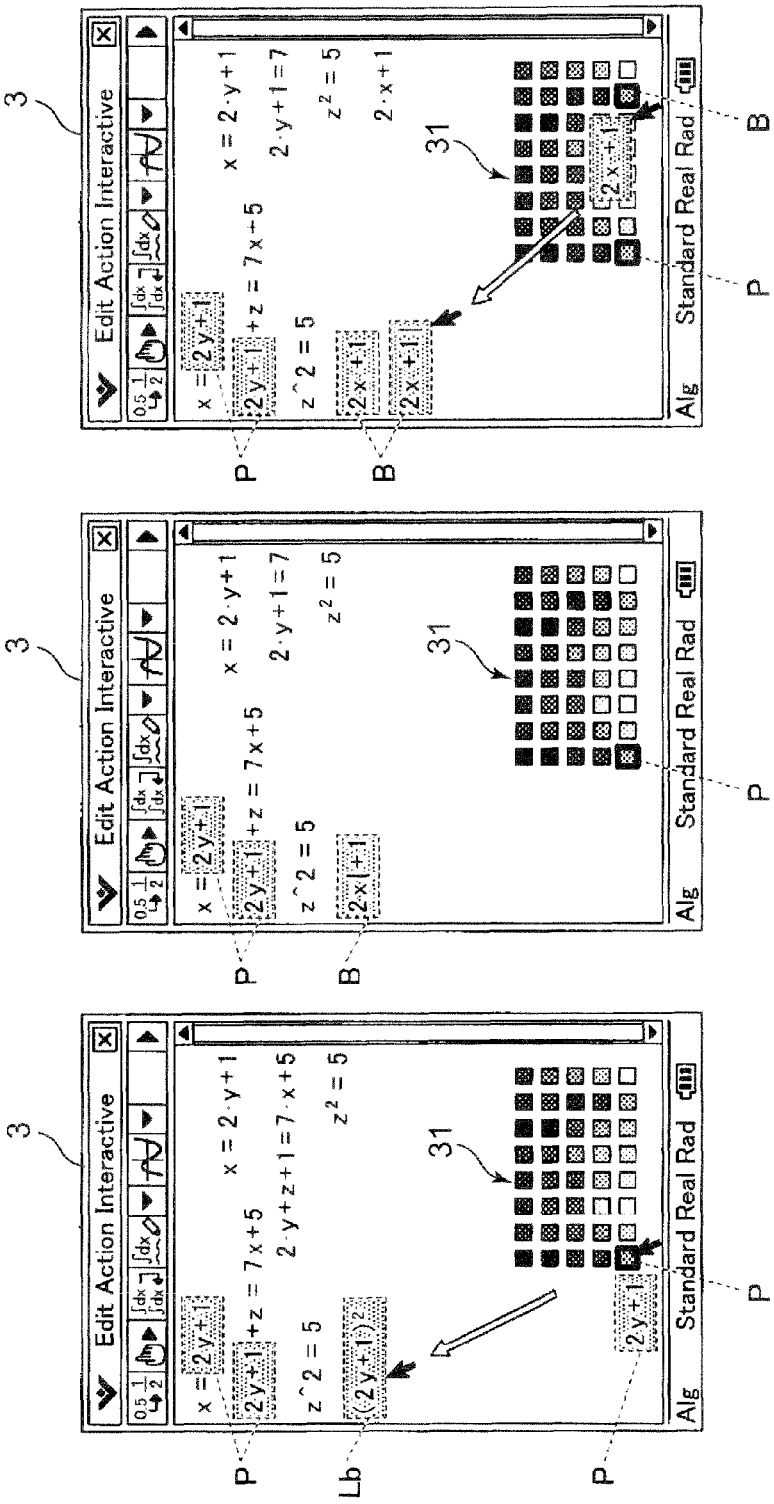

FIG. 9

| No. | COLOR | EXPRESSION PORTION | VARIABLE NUMBER |
|---|---|---|---|
| 1 | | | |
| 2 | | | |
| 3 | | 8−2x | y |
| 4 | | a+b | A |
| 5 | | 2y+1 | |
| 6 | | | |
| 7 | | | |
| 8 | | $(a+b)^2$ | |
| 9 | | | |
| 10 | | | |
| ⋮ | ⋮ | ⋮ | ⋮ |
| 26 | | | |
| 27 | | | |
| 28 | | 2(a+b)c | |
| 29 | | | |
| 30 | | | |
| ⋮ | ⋮ | ⋮ | ⋮ |

| No. | COLOR | EXPRESSION PORTION | VARIABLE NUMBER TO BE SUBSTITUTED |
|---|---|---|---|
| 1 | RED | a+b | A |
| 2 | BLUE | | |
| 3 | GREEN | | |

| No. | COLOR | EXPRESSION PORTION | VARIABLE NUMBER TO BE SUBSTITUTED |
|---|---|---|---|
| 1 | RED | 8-2x | y |
| 2 | BLUE | 3 | x |
| 3 | GREEN | | |

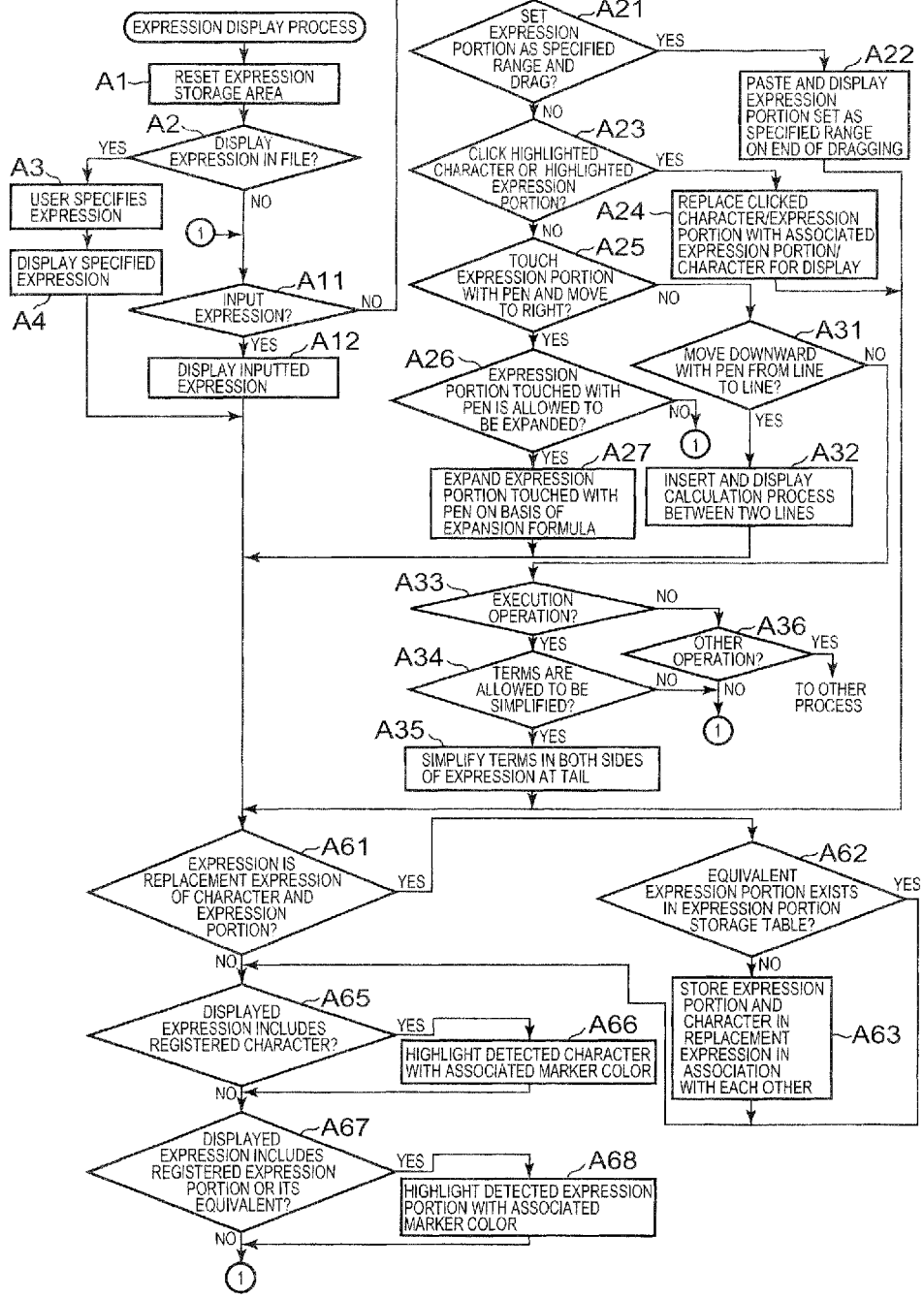

FIG. 20A
$$\begin{cases} 2x + y = 8 \\ 3x - 4y = 1 \end{cases}$$
$y = 8 - 2x$
$11x = 1 + 32$
~1210

FIG. 20B
$$\begin{cases} 2x + y = 8 \\ 3x - 4y = 1 \end{cases}$$
$y = 8 - 2x$
$\boxed{11}x = 33$
~1210

FIG. 20C
$$\begin{cases} 2x + y = 8 \\ 3x - 4y = 1 \end{cases}$$
$y = 8 - 2x$
$x = 3$
~1210

FIG. 20D
$$\begin{cases} 2x + y = 8 \\ 3x - 4y = 1 \end{cases}$$
$y = 8 - 2x$
$x = 3$
~1210

FIG. 20E
$$\begin{cases} 2x + y = 8 \\ 3x - 4y = 1 \end{cases}$$
$y = 8 - 2x$
$x = 3$
$y = 8 - 2x$
~1210

FIG. 20F
$$\begin{cases} 2x + y = 8 \\ 3x - 4y = 1 \end{cases}$$
$y = 8 - 2x$
$x = 3$
$y = 8 - 2 \cdot 3$
~1210

FIG. 20G
$$\begin{cases} 2x + y = 8 \\ 3x - 4y = 1 \end{cases}$$
$y = 8 - 2x$
$x = 3$
$y = 1$
~1210

EXPRESSION INPUT APPARATUS, EXPRESSION DISPLAY APPARATUS, EXPRESSION INPUT METHOD, EXPRESSION DISPLAY METHOD, RECORDING MEDIUM STORING EXPRESSION INPUT CONTROL PROGRAM, AND RECORDING MEDIUM STORING EXPRESSION DISPLAY CONTROL PROGRAM

BACKGROUND OF THE INVENTION

1. Field of the Invention

The present invention relates to an expression input apparatus such as a scientific electronic calculator, an expression display apparatus, a method of inputting an expression, a method of displaying an expression, a recording medium storing an expression input control program, and a recording medium storing an expression display control program.

2. Description of Related Art

In conventional expression input apparatuses such as scientific electronic calculators, a plurality of inputted expression portions can be each copied and stored in clipboards to paste intended expression portions (for example, see Japanese Unexamined Patent Application Publication No. 4-252351). In more detail, a technique disclosed in this patent document stores a copied expression portion in association with a number. A user then specifies the number to paste the expression portion associated with the specified number on a cursor position.

In the conventional technique, a user must memorize the relationship between the stored expression portions and the corresponding numbers or operate the apparatus to display the relationship on a display before the pasting. This precludes a smooth pasting operation. Further, the conventional technique is not convenient to replace an expression portion with a character for calculation. In a calculation process, a part of the expression may be replaced with a character for step-by-step calculation. For example, to expand $(a+b+c)^2$, "a+b" is replaced with "A" to expand "$(A+c)^2$". Then, "a+b" is substituted for "A" in an expanded expression "$A^2+2Ac+c^2$" for further expansion. In the conventional technique applied to such a case, when the expression portion "a+b" is copied for use, the "A" replacing "a+b" is not highlighted. Accordingly, a character to be replaced with the expression portion cannot be easily discriminated.

SUMMARY OF THE INVENTION

It is an object of the present invention to provide an expression input apparatus, a method of inputting an expression, and a recording medium storing an expression input control program capable of easily pasting plural copied expression portions. It is another object of the present invention to provide an expression display apparatus, a method of displaying an expression, and a recording medium storing an expression display control program capable of easily replacing a character with an expression portion, and replacing an expression portion with a character for calculation.

According to a first aspect of the present invention, there is provided an expression input apparatus including: an expression input unit that receives an input of an expression by a user; an expression display unit that displays the expression inputted through the expression input unit; an expression/color specifying unit that specifies an expression portion in the expression displayed on the expression display unit and that specifies a color among a plurality of colors, on the basis of a user operation; an expression/color storage unit that stores the expression portion and the color specified by the expression/color specifying unit, with the expression portion and the color being associated with each other; a highlighting control unit that highlights the expression portion with the color, in the expression displayed on the expression display unit, the expression portion and the color being stored in association with each other in the expression/color storage unit; a color/position specifying unit that specifies the color stored in association with the expression portion in the expression/color storage unit, and that specifies a position at which a new expression portion is to be inputted, on the basis of the user operation; and a pasting unit that pastes the expression portion, stored in association with the color specified by the color/position specifying unit, on the position specified by the color/position specifying unit, and highlights the pasted expression portion with the color specified by the color/position specifying unit.

According to a second aspect of the present invention, there is provided an expression display apparatus including: an expression display unit that displays at least one expression; a replacement expression detecting unit that detects a replacement expression, where a character and an expression portion are connected with each other by an equal sign, from the expression displayed on the expression display unit; an expression/character storage unit that stores the expression portion and the character on respective sides of the replacement expression, with the expression portion and the character being associated with each other; a registered expression/character detecting unit that detects the expression portion and the character stored in the expression/character storage unit from the expression displayed on the expression display unit; and a highlighting control unit that highlights the expression portion and the character detected by the registered expression/character detecting unit, on the expression display unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 illustrates a color copy buffer.

FIGS. 6A to 6C illustrate contents displayed on the display.

FIG. 9 illustrates a color copy buffer in a second embodiment.

FIGS. 16A and 16B illustrate a table storing expression portions.

FIG. 17 is a flowchart illustrating the operation of an expression display process.

FIGS. 20A to 20G illustrate contents displayed on the display.

DESCRIPTION OF THE PREFERRED EMBODIMENTS

Embodiments according to the present invention will now be described in detail with reference to the accompanying drawings. The scope of the invention, however, should not be limited to the illustrated embodiments.

1. First Embodiment

The configuration of an electronic device in a first embodiment will be described.

[1.1 Appearance Configuration]

Figure 1:
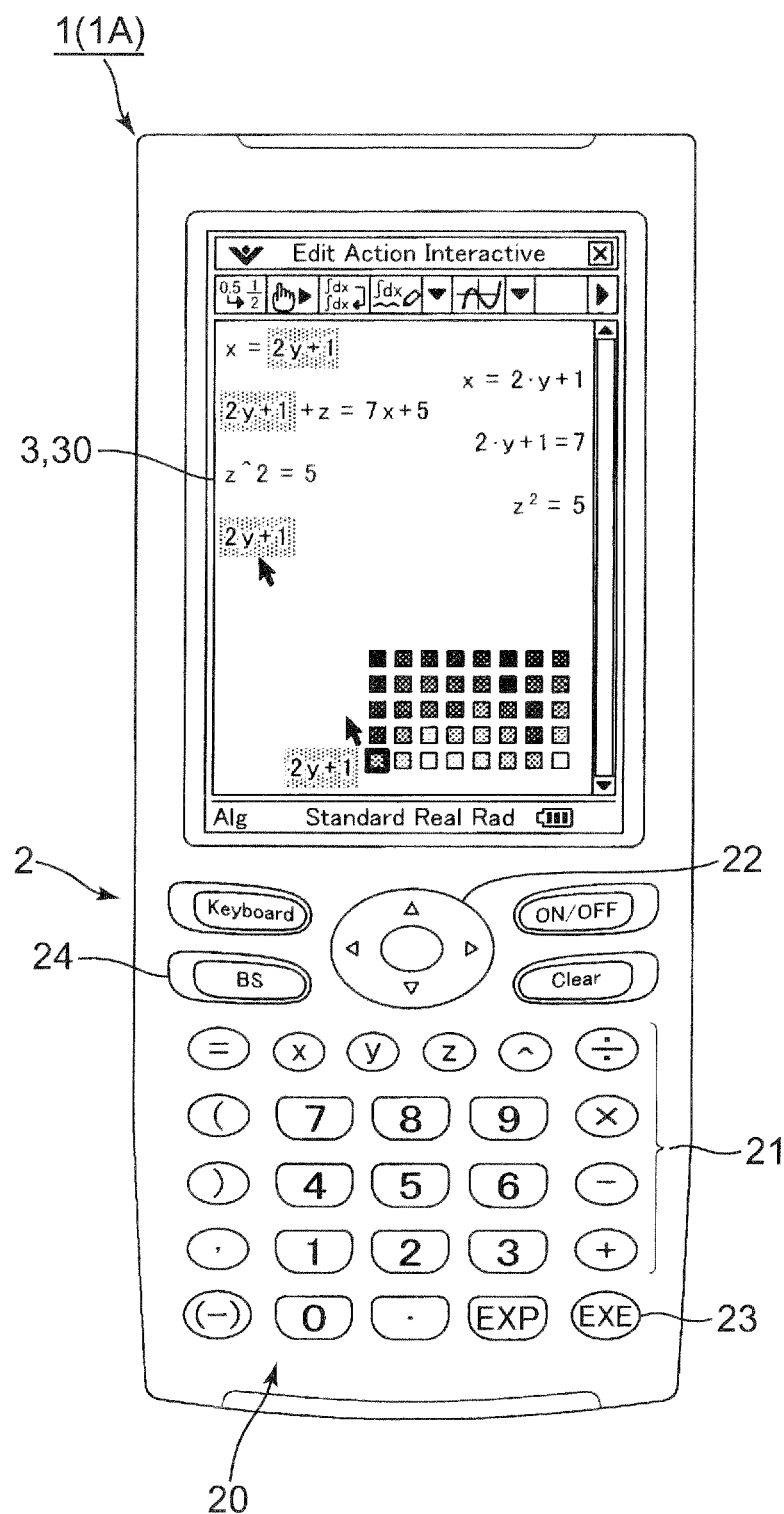
FIG. 1 is a plan view illustrating a schematic configuration of a scientific electronic calculator according to an embodiment of the present invention.

FIG. 1 is a plan view illustrating a schematic configuration of a scientific electronic calculator 1 to which an electronic device according to the present invention is applied.

As illustrated in FIG. 1, the scientific electronic calculator 1 has an input key group 2 consisting of various types of keys and a display 3.

The input key group 2 receives the input operation of expression elements, such as numerals and arithmetic operation symbols, and receives the operations of various processing commands by a user. The input key group 2 consists of a plurality of keys which have their unique assigned functions. In the present embodiment, the input key group 2 includes, for example, a numerical keypad 20, arithmetic operation symbol keys 21, a cursor key 22, an EXE key 23, and a DEL key 24.

Among these keys, the numerical keypad 20 includes keys for receiving the input operations of numerical values, and the arithmetic operation symbol keys 21 receive the input operations of, for example, arithmetic operators and brackets for four arithmetic operations.

The cursor key 22 is pressed to move a cursor, which indicates a position to be edited or a position to be selected, in a predetermined direction on the display 3, for example. The cursor key 22 can receive inputs for four directions of up, down, left and right in the present embodiment.

The EXE key 23 receives the input operation of an execution command or a determination command for processing, and functions as a key for commanding an execution of arithmetic processing after an expression is input, for example. The DEL key 24 receives the deletion operation of a numerical value or an arithmetic operation symbol displayed on the display 3.

The display 3 includes, for example, a liquid crystal display (LCD) or an electronic luminescent display (ELD). The display 3 displays various pieces of data required for the operation of the scientific electronic calculator 1, as well as characters, signs, expressions and the result of an arithmetic operation, for example, in response to the operation of the input key group 2 or any other key. The display 3 according to the present embodiment is provided with a touch panel 30 over the entire display screen, the touch panel 30 being integrated with the display 3.

[1.2 Functional Configuration]

The functional configuration of the scientific electronic calculator 1 will now be described.

Figure 2:
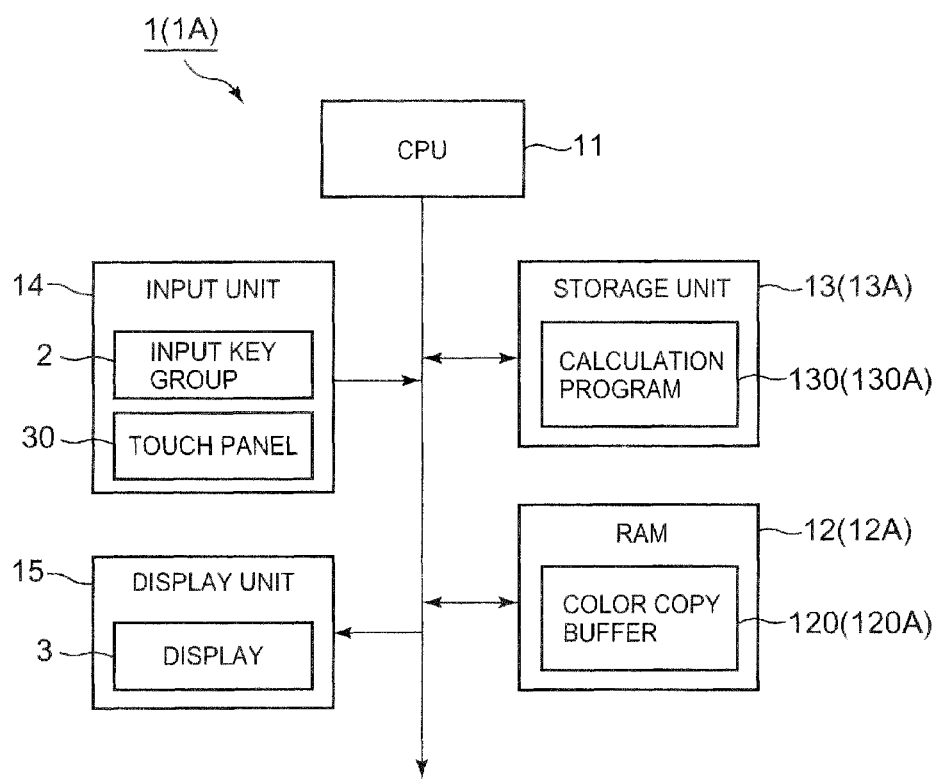
FIG. 2 is a schematic block diagram illustrating a functional configuration of the scientific electronic calculator.

FIG. 2 is a schematic block diagram illustrating a functional configuration of the scientific electronic calculator 1.

As illustrated in FIG. 2, the scientific electronic calculator 1 includes an input unit 14, a display unit 15, a random access memory (RAM) 12, a storage unit 13, and a central processing unit (CPU) 11.

The input unit 14 includes the input key group 2 and the touch panel 30, and outputs an operation signal corresponding to a pressed key or a touched position in the touch panel 30 to the CPU 11.

The display unit 15 includes the display 3, and displays various pieces of information on the display 3 in response to a display signal from the CPU 11.

The RAM 12 is a volatile memory for storing information temporarily, and includes a plurality of work areas to store, for example, various programs to be executed and data related to these programs. For example, the RAM 12 according to the present embodiment includes a copy buffer 120 for each color (hereinafter referred to as a color copy buffer 120) as the work area.

Figure 3:
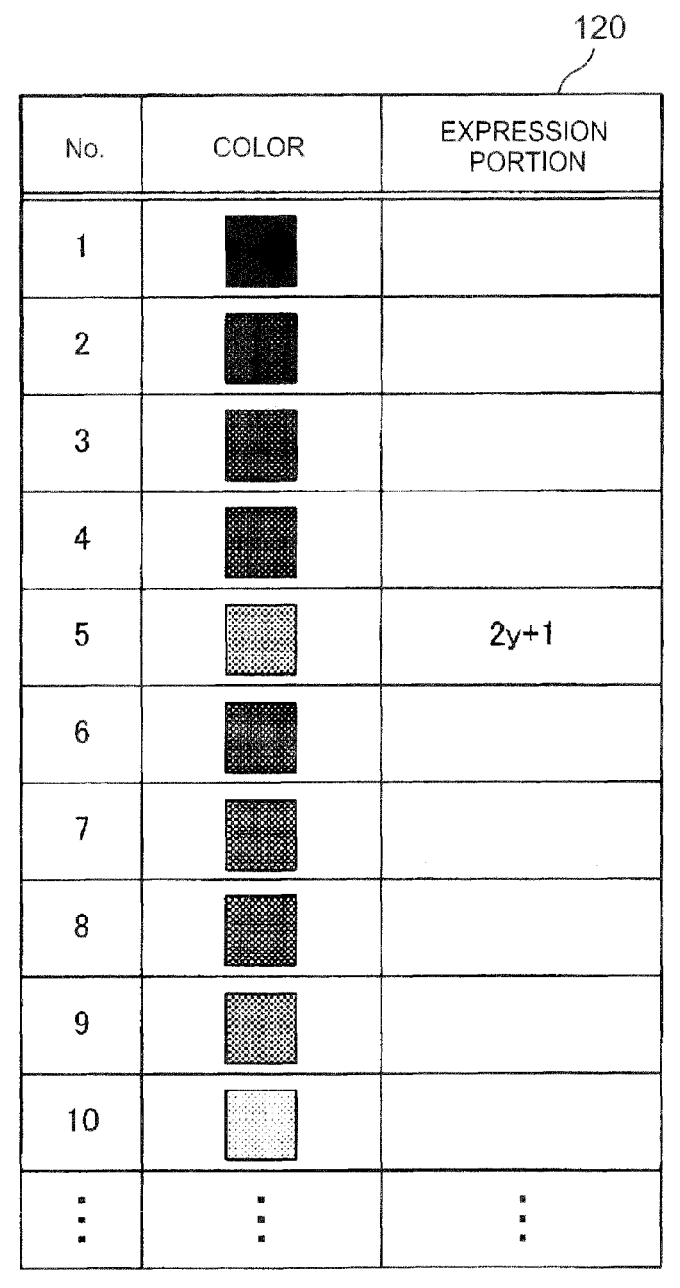

As illustrated in FIG. 3, the color copy buffer 120 stores an expression portion to be copied in a calculation process (see FIG. 4) described below, in association with any of a plurality of colors. Herein, an expression portion means a portion of an expression, and may be composed of one symbol (including a character and a numeral), or may be composed of two or more successive symbols.

The storage unit 13 is a nonvolatile memory which is composed of, for example, a read only memory (ROM), and stores various programs and various pieces of data. More specifically, the storage unit 13 stores a calculation program 130 according to the present invention.

The calculation program 130 causes the CPU 11 to execute the calculation process (see FIG. 4) described below.

The CPU 11 comprehensively controls each unit of the scientific electronic calculator 1. More specifically, the CPU 11 expands a specified program among system programs and various application programs stored in the storage unit 13, in the RAM 12, and executes various processes in collaboration with the program expanded in the RAM 12.

[1.3 Operation of Scientific Electronic Calculator]

The operation of the scientific electronic calculator 1 will now be described.

Figure 4:
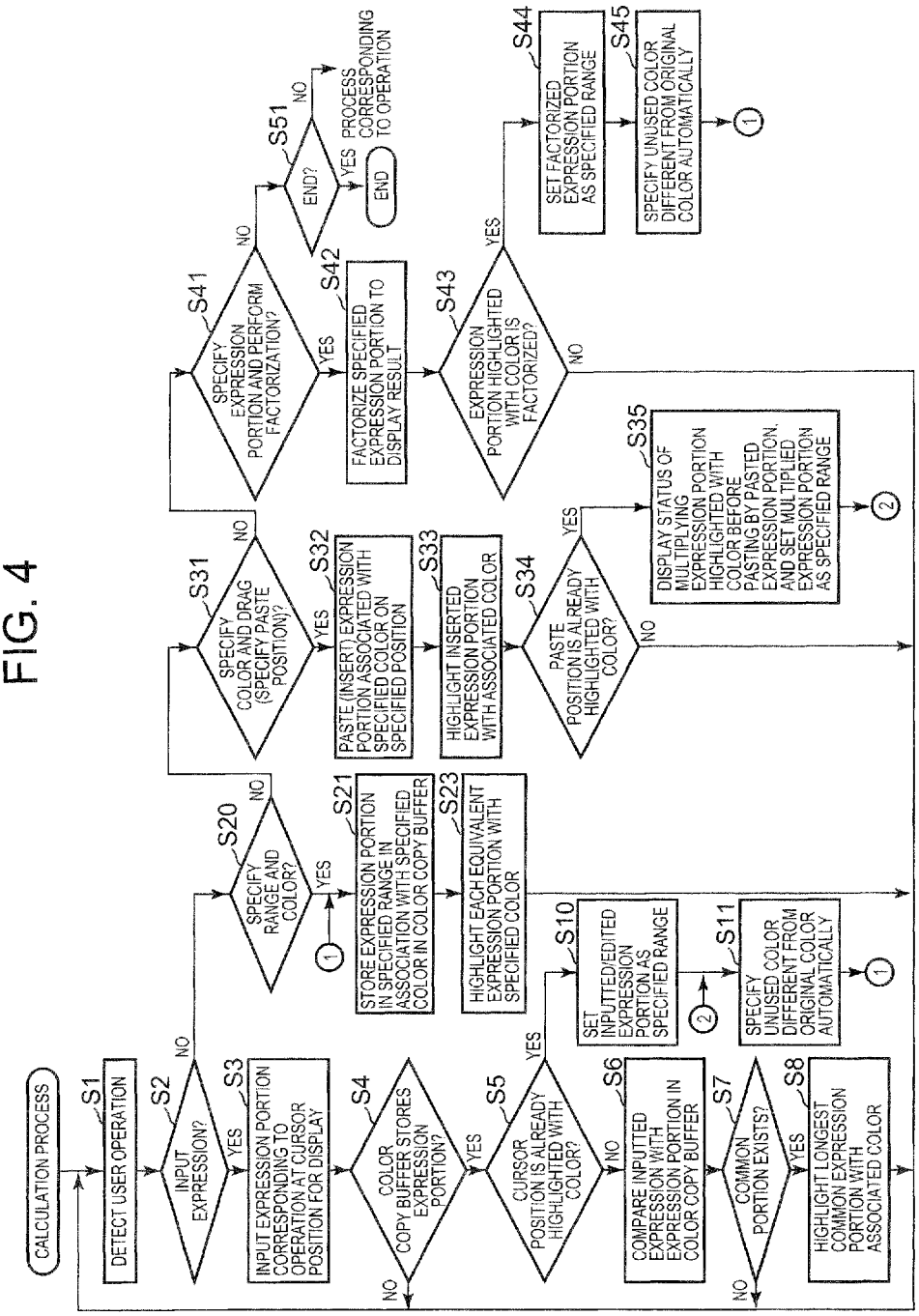
FIG. 4 is a flowchart illustrating the operation of a calculation process.

FIG. 4 is a flowchart illustrating the operation of the calculation process. When a user inputs an execution command to perform the calculation process through the input unit 14, the calculation program 130 is read from the storage unit 13 and adequately expanded in the RAM 12. As a result, the calculation process is executed through collaboration of the calculation program 130 with the CPU 11.

As illustrated in FIG. 4, in the calculation process, the CPU 11 displays a color chart 31 (see FIGS. 5A to 5C), represented by the colors in the color copy buffer 120, on the display 3 while detecting a user operation (Step S1), and determines whether the detected user operation is an input operation of an expression (Step S2). In the present embodiment, the input operation of an expression includes an edit operation of an expression.

If the user operation is an input operation of an expression in Step S2 (Step S2; Yes), the CPU 11 inputs an expression portion corresponding to the input operation to a cursor position on the display 3 and displays the portion on the display 3 (Step S3).

The CPU 11 then determines whether the color copy buffer 120 stores an expression portion (Step S4). If the color copy buffer 120 does not store an expression portion (Step S4; No), the process of the CPU 11 goes to Step S1.

If the color copy buffer 120 stores an expression portion in Step S4 (Step S4; Yes), the CPU 11 determines whether the cursor position (input position or edit position) is included in an expression portion highlighted with a color (expression portion stored in the color copy buffer 120), i.e., whether an expression portion including the cursor position is highlighted with a color (Step S5). In the present embodiment, an expression portion highlighted with a color is referred to as an expression portion highlighted with any color in the color chart 31, preferably as an expression portion indicated with a marker using a color in the color chart 31. Alternatively, the expression portion itself may be displayed in a color in the color chart 31 or the expression portion may be underlined with a color in the color chart 31.

If the cursor position (input position or edit position) is not included in an expression portion highlighted with a color in Step S5 (Step S5; No), the CPU 11 compares an expression portion extractable from an inputted expression with an expression portion stored in the color copy buffer 120 (Step S6).

The CPU 11 then determines whether a common expression portion exists that is extractable from an inputted expression and is stored in the color copy buffer 120 (Step S7). If such an expression portion does not exist (Step S7; No), the process of the CPU 11 goes to Step S1.

If a common expression portion is present that is extractable from an inputted expression and is stored in the color copy buffer 120 in Step 7 (Step S7; Yes), the CPU 11 detects a color associated in the color copy buffer 120 with the longest expression portion among the common expression portions, highlights the corresponding expression portion (the longest, extractable, and stored expression portion) in the inputted expression with the associated color (Step S8), and then the process goes to Step S1.

If the cursor position (input position or edit position) is included in an expression portion highlighted with a color in Step S5 (Step S5; Yes), the CPU 11 sets the expression portion, which is inputted and edited (modified) in Step S3, as a specified range (expression portion highlighted with a color and including the cursor position) (Step S10), then sets a color in the color chart 31, which is different from the color associated with the expression portion in the color copy buffer 120 before the modifying (editing), as a specified color (Step S11), and the process goes to Step S21 described below. In the present embodiment, when being selected as a specified range, the expression portion is stored as an object to be copied. Accordingly, after an expression portion stored in the color copy buffer 120 is edited (modified), the edited expression portion is newly stored in the color copy buffer 120, in a process in and after Step S21, in association with a color in the color chart 31 different from the color associated with the expression portion in the color copy buffer 120 before the editing. A specified color in Step S11 may be set as, for example, a complementary color of a color associated with the expression portion before the editing.

If the user operation is not an input operation of an expression in Step S2 (Step S2; No), the CPU 11 determines whether the user operation is an operation for specifying the range of an expression portion and specifying a display color from the color chart 31 (Step S20).

If the user operation is an operation for specifying a range and specifying a display color in Step S20 (Step S20; Yes), the CPU 11 stores the expression portion in the specified range in association with the specified color, in the color copy buffer 120 (Step S21).

The CPU 11 then highlights the expression portion selected as the specified range and an expression portion having the same content (the same value or equivalent) as the selected expression portion, with the specified color, among the expression(s) displayed on the display 3, (Step S23), and the process goes to Step S1. Accordingly, the expression portion selected as the specified range and an expression portion having the same content (the same value or equivalent) as the selected expression portion are both highlighted with the color associated with the selected expression portion stored in the color copy buffer 120.

If the user operation is not an operation for specifying a range and specifying a display color in Step S20 (Step S20; No), the CPU 11 determines whether the user operation is an operation for specifying a display color from the color chart 31 and dragging the color patch (or specifying a display color from the color chart 31 and specifying a paste position) (Step S31). In the present embodiment, when a display color is specified from the color chart 31 and the color patch is dragged, an expression portion corresponding to the color is pasted on the position specified by the dragging (end position of the dragging). Similarly, when a display color is specified from the color chart 31 and a paste position is specified, an expression portion corresponding to the color is pasted on the specified position.

If the user operation is an operation for specifying a color and dragging (or specifying a color and specifying a paste position) in Step S31 (Step S31; Yes), the CPU 11 pastes an expression portion associated with the color in the color copy buffer 120 for inputting (inserting) the expression portion on the specified position (position specified by the dragging or the specifying of a paste position) (Step S32).

The CPU 11 then highlights the pasted expression portion with a specified color, i.e., a color associated with the expression portion in the color copy buffer 120 (Step S33).

In Step S34, the CPU 11 determines whether the paste position is included in an expression portion highlighted with a color, i.e., whether an expression portion including the paste position is highlighted with a color. If the paste position is not included (Step S34; No), the process of the CPU 11 goes to Step S1.

If the paste position is included in the expression portion highlighted with a color in Step S34 (Step S34; Yes), the CPU 11 displays a status of multiplying the expression portion by the pasted expression portion, and sets the multiplied expression portion as a specified range (Step S35), and then the process goes to Step S11. If the expression portion highlighted with the color is the same as the pasted expression portion, the CPU 11 displays the expression portion in the form of a power in Step 35. Accordingly, the expression portion displayed in the form of a power is newly stored in the color copy buffer 120 in association with a color in the color chart 31 different from the color associated with the expression portion in the color copy buffer 120 before being displayed in the form of a power in processing in and after Step S11.

If the user operation is not an operation for specifying a color and dragging (or specifying a color and specifying a paste position) in Step S31 (Step S31; No), the CPU 11 determines whether the user operation is an operation for specifying an expression portion and performing factorization (Step S41).

If the user operation is an operation for specifying an expression portion and performing factorization in Step S41 (Step S41; Yes), the CPU 11 factorizes the expression portion specified by the user operation in the displayed expression(s) and the result is displayed (Step S42). The expression portion can be factorized by any known conventional technique.

The CPU 11 then determines whether an expression portion highlighted with a color is factorized (Step S43). If the expression portion highlighted with a color is not factorized (Step S43; No), the process of the CPU 11 goes to Step S1.

If the expression portion highlighted with a color is factorized in Step S43 (Step S43; Yes), the CPU 11 sets the factorized expression portion as a specified range (Step S44) and sets a color in the color chart 31, different from the color associated with the expression portion in the color copy buffer 120 before the factorization, as a specified color (Step S45). The process then goes to Step S21. Accordingly, after the expression portion stored in the color copy buffer 120 is factorized, the factorized expression portion is newly stored, in processing in and after Step S21, in the color copy buffer 120 in association with a color in the color chart 31 different from the color associated with the expression portion in the color copy buffer 120 before the factorization. A specified color in Step S45 may be set as, for example, a color similar to a color associated with the expression portion before the factorization.

If the user operation is not an operation for specifying an expression portion and performing factorization in Step S41 (Step S41; No), the CPU 11 determines whether the user operation is an operation of ending (Step S51).

If the user operation is not an operation of ending in Step S51 (Step S51; No), the CPU 11 performs processing corresponding to the user operation. Conversely, if the user operation is an operation of ending in Step S51 (Step S51; Yes), the CPU 11 ends the calculation process.

[1.4 Operation Examples]

The operation of the scientific electronic calculator 1 will now be described in detail with reference to the accompanying drawings. In the accompanying drawings illustrating the following operation example, characters in the regions surrounded by dashed lines on the screen of the display 3 are displayed with colors ("Lb": Light blue, "B": Blue, "P": Pink, "R": Red, "Y": Yellow, and "V": Violet) associated with the respective regions.

Operation Example 1

Figure 5A:
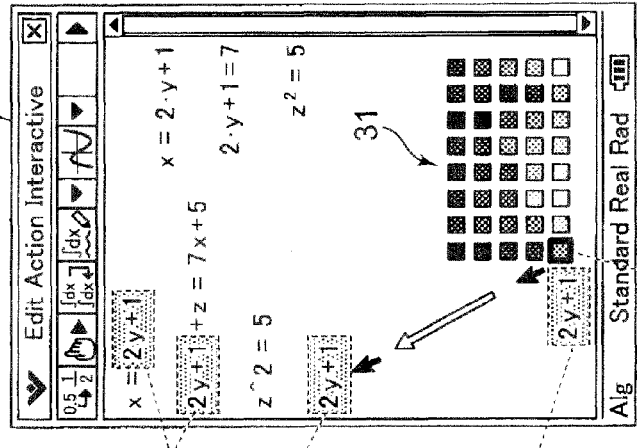
FIGS. 5A to 5C illustrate contents displayed on a display.

As illustrated in FIG. 5A, the calculation process is performed, and the color chart 31 then appears on the display 3.

A user then inputs expressions, "x=2y+1", "2y+1+Z=7x+5", and "z^2=5" (Step S2; Yes). The expressions corresponding to the input operation appear at the cursor position on the display 3 (Step S3).

Figure 5B:
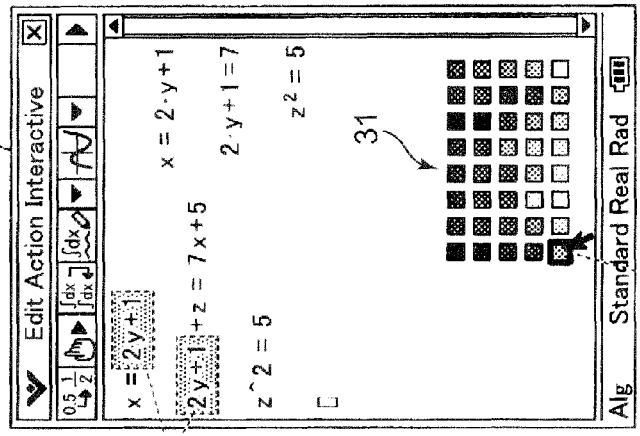

The user then specifies the range of an expression portion "2y+1" and the display color "pink" in the color chart 31 (Step S20; Yes). The specified expression portion "2y+1" is stored in the color copy buffer 120 in association with the specified color "pink" (Step S21). As illustrated in FIG. 5B, among the expressions on the display 3, the expression portion "2y+1" (in the first line in FIG. 5B) selected as the specified range and an expression portion "2y+1" (in the second line in FIG. 5B) having the same content as the selected expression portion are highlighted with the specified color "pink" (Step S23). In this operation example, when an expression portion is stored in the color copy buffer 120 in association with a color, the patch of the associated color in the color chart 31 is marked in a manner surrounded by a thick frame.

Figure 5C:
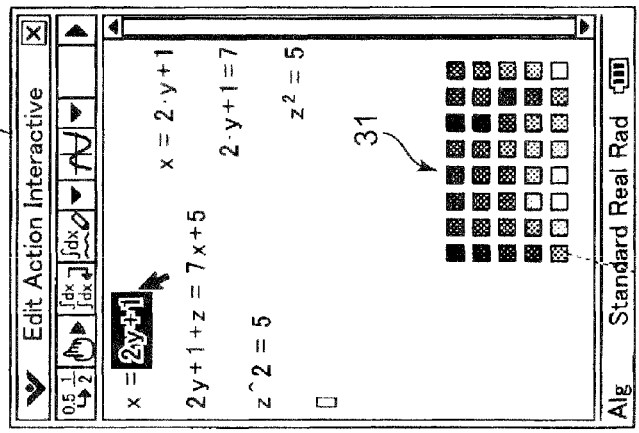

As illustrated in FIG. 5C, the user then specifies the display color "pink" from the color chart 31 and drags the color patch "pink" (Step S31; Yes). The expression portion "2y+1" associated with the specified color "pink" in the color copy buffer 120 is pasted on the specified position to be inputted (inserted) (Step S32). The pasted expression portion "2y+1" is then highlighted with the specified color "pink" (Step S33). In this operation example, when a color patch is dragged, the expression portion associated with the color in the color copy buffer 120 appears near a pointer ("2y+1" at the bottom of FIG. 5C).

Next, as illustrated in FIG. 6A, the user specifies the display color "pink" from the color chart 31 and drags the color patch "pink" (Step S31; Yes). The expression portion "2y+1" associated with the specified color "pink" in the color copy buffer 120 is pasted on the specified position to be inputted (inserted) (Step S32).

It is then determined that the paste position is included in the expression portion "2y+1" highlighted with a color (Step S34; Yes). The originally highlighted expression portion "2y+1" and the pasted expression portion "2y+1" are displayed in the form of a power, and the multiplied expression portion "$(2y+1)^2$" is set as a specified range (Step 235).

Among the colors in the color chart 31, "light blue", which is a color different from "pink" associated with the expression portion "2y+1" in the color copy buffer 120 before the editing, is then set as a specified color (Step S11). The specified expression portion "$(2y+1)^2$" is stored in the color copy buffer 120 in association with the specified color "light blue" (Step S21). Then, the expression portion "$(2y+1)^2$" set as the specified range, among the expressions displayed on the display 3, is highlighted with the specified color "light blue" (Step S23).

When the user edits the expression portion "2y+1" in the status illustrated in FIG. 5C (Step S2; Yes), "y" of "2y+1" varies to "x" in response to the edit and the result of the edit is displayed, as illustrated in FIGS. 6B and 6C (Step S3).

It is then determined that the cursor position (input position or edit position) is included in the expression portion "2x+1" highlighted with the color (Step S5; Yes). The expression portion "2x+1" is set as a specified range (Step S10), and then "blue" in the color chart 31, which is a color different from "pink" associated with the expression portion "2y+1" in the color copy buffer 120 before the editing, is set as a specified color (Step S11). The expression portion "2x+1" set as the specified range is then stored in the color copy buffer 120 in association with the specified color "blue" (Step S21). Then, the expression portion "2x+1" set as the specified range among the expressions displayed on the display 3 is highlighted with the specified color "blue" (Step S23).

Next, as illustrated in FIG. 6C, the user specifies the display color "blue" from the color chart 31 and drags the color patch "blue" (Step S31; Yes). The expression portion "2x+1" associated with the specified color "blue" in the color copy buffer 120 is pasted on the specified position to be inputted (inserted) (Step S32).

Operation Example 2

Figure 7:
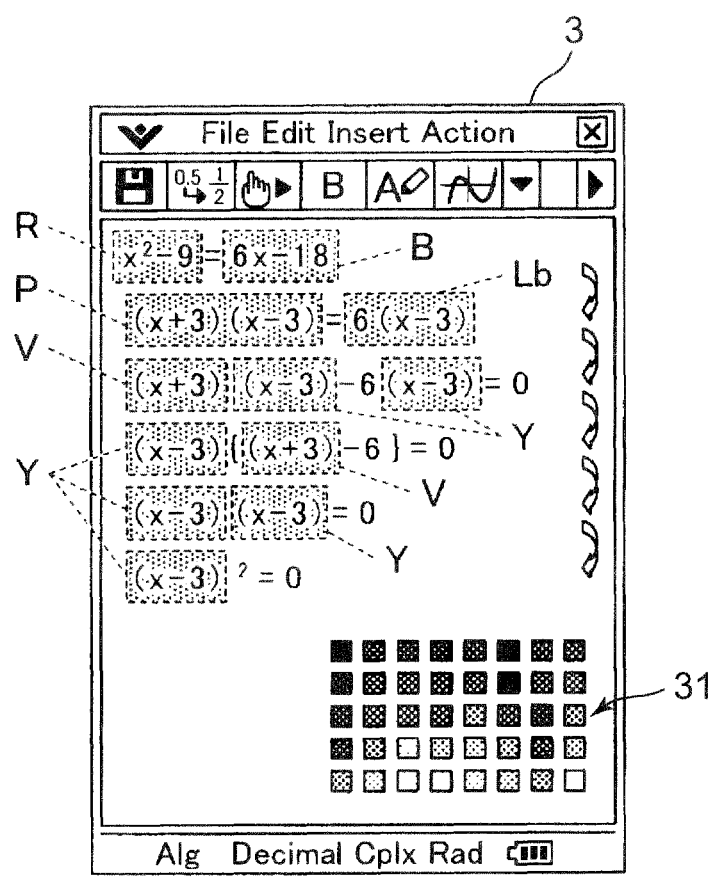
FIG. 7 illustrates contents displayed on the display.

As illustrated in FIG. 7, the calculation process is performed, and the color chart 31 then appears on the display 3.

As illustrated in the first line in FIG. 7, the user then inputs an expression "$x^2-9=6x-18$" (Step S2; Yes). The expression corresponding to the input operation appears at the cursor position on the display 3 (Step S3). In FIG. 7, when the display status of an expression is changed, the changed expression is arranged below the original expression.

The user then sets the expression portion "$x^2-9$" as a specified range and specifies "red" (Step S20; Yes). The expression portion "$x^2-9$" in the specified range is stored in the color copy buffer 120 in association with the specified color "red" (Step S21). Then, the expression portion "$x^2-9$" set as the specified range among the expressions displayed on the display 3 is highlighted with the specified color "red" (Step S23).

Similarly, the user sets the expression portion "6x−18" as a specified range and specifies "blue" (Step S20; Yes). The expression portion "6x−18" in the specified range is stored in the color copy buffer 120 in association with the specified color "blue" (Step S21). Then, the expression portion "6x−18" set as the specified range among the expressions displayed on the display 3 is highlighted with the specified color "blue" (Step S23).

The user then specifies an expression portion "$x^2-9$" and performs factorization (Step S41; Yes). The specified expression portion "$x^2-9$" is factorized into "(x+3) (x−3)" and the result is displayed as illustrated in the second line in FIG. 7 (Step S42). It is then determined that the expression portion "$x^2-9$" highlighted with a color is factorized (Step S43; Yes), the factorized expression portion "(x+3) (x−3)" is set as a specified range (Step S44), and then "pink", which is a color different from "red" in the color chart 31 associated with the expression portion "$x^2-9$" in the color copy buffer 120 before the factorization, is set as a specified color (Step S45). The expression portion "(x+3)(x−3)" set as the specified range is then stored in the color copy buffer 120 in association with the specified color "pink" (Step S21). Then, the expression portion "(x+3)(x−3)" set as the specified range among the expressions displayed on the display 3 is highlighted with the specified color "pink" (Step S23).

Similarly, the user specifies the expression portion "6x−18" and performs factorization (Step S41; Yes). The specified expression portion "6x−18" is factorized into "6(x−3)" and the result is displayed (Step S42). It is then determined that the expression portion "6x−18" highlighted with a color is factorized (Step S43; Yes), the factorized expression portion "6(x−3)" is set as a specified range (Step S44), and then "light blue" different from "blue" in the color chart 31 associated with the expression portion "6x−18" in the color copy buffer 120 before the factorization is set as a specified color (Step S45). The expression portion "6(x−3)" set as the specified range is then stored in the color copy buffer 120 in association with the specified color "light blue" (Step S21). Then, the expression portion "6(x−3)" set as the specified range among the expressions displayed on the display 3 is highlighted with the specified color "light blue" (Step S23).

As illustrated in the third line in FIG. 7, the user then moves the right side of the expression "(x+3)(x−3)=6(x−3)" to the left side (Step S51; No), sets the expression portion "x−3" as a specified range, and specifies "yellow" for the portion (Step S20; Yes). The expression portion "x−3" in the specified range is stored in the color copy buffer 120 in association with the specified color "yellow" (Step S21). Then, the expression portion "x−3" (the left one), which is set as the specified range, and an expression portion "x−3" (the right one), which has the same content as the portion in the specified range, are both highlighted with the specified color "yellow" (Step S23). In this operation example, the expression portion "x+3" at this time is highlighted with "violet".

As illustrated in the fourth to sixth lines in FIG. 7, the user then simplifies of the expression "(x+3) (x−3)−6(x−3)=0" through "(x−3) (x−3)=0" and "(x−3) {(x+3)−6}=0" into "(x−3)$^2$=0" (Step S51; No). The expression portion "x−3" in each of the changed expressions is highlighted with "yellow".

As described above, according to the present embodiment, as illustrated in, for example, Steps S20 to S23 and S31 to S33 of FIG. 4 and FIGS. 5A to 5C, the user specifies an expression portion in the displayed expression and specifies a display color from the color chart 31. The specified expression portion is stored in the color copy buffer 120 in association with the specified color and is highlighted with the specified color. In this status, the user specifies a color in the color chart 31 associated with an expression portion and specifies an input position for a new expression portion. The expression portion associated with the specified color is inputted to the specified position, and the inputted expression portion is highlighted with the color associated therewith. An expression portion highlighted with a color in the expression can be therefore pasted on a specified position by specifying the color from the color chart 31 and specifying the input position. If plural expression portions are copied, each of the expression portions can be pasted more easily than conventional techniques by specifying the color for highlighting the corresponding expression portion from the color chart 31.

Further, as illustrated in, for example, Step S23 of FIG. 4 and FIG. 5B, an expression portion displayed on the display 3 and stored in the color copy buffer 120 is highlighted with the associated color. This can clearly indicate which color in the color chart 31 is associated with the expression portion.

As illustrated in, for example, Steps S41 to S45 of FIG. 4 and FIG. 7, when the expression portion stored in the color copy buffer 120 is factorized, the factorized expression portion can be automatically stored in the color copy buffer 120. Further, a factorized expression portion is stored in the color copy buffer 120 in association with a color in the color chart 31 similar to the color associated with the expression portion before the factorization. As a result, the factorized expression portion and an expression portion having the same content as the factorized expression portion are highlighted with the same color (the color similar to the color associated with the expression portion before the factorization). This can clearly indicate which expression portion is factorized into which expression portion in an expression.

As illustrated in, for example, Step S35 of FIG. 4 and FIG. 6A, when the expression portion already displayed at a paste position is the same as an expression portion associated with a color specified from the color copy buffer 120 for the paste operation, the expression portion is inputted in the form of a power and stored in the color copy buffer 120 in association with a color in the color chart 31 different from the color associated with the original expression portion before becoming in the form of a power. This can highlight the expression portion inputted in the form of a power and an expression portion having the same content as the inputted expression portion with the same color.

As illustrated in, for example, Steps S10 to S11 of FIG. 4 and FIG. 6B, when an expression portion stored in the color copy buffer 120 is edited (modified), the edited expression portion is stored in the color copy buffer 120 in association with a color in the color chart 31 different from the color associated with the expression portion before the editing. This can highlight the edited expression portion and an expression portion having the same content as the edited expression portion with the same color.

2. Second Embodiment

The configuration of an electronic device in a second embodiment will now be described. Similar components to those of the first embodiment are designated with identical reference numerals, and repetitive descriptions thereon will be omitted.

[2.1 Functional Configuration]

As illustrated in FIG. 2, a scientific electronic calculator 1A in the present embodiment includes a RAM 12A, and a storage unit 13A.

The RAM 12A includes, for example, a copy buffer 120A for each color (hereinafter referred to as a color copy buffer 120A) as the work area. As illustrated in FIG. 9, the color copy buffer 120A stores an expression portion to be copied in a calculation process (see FIG. 10) described below in association with any of a plurality of colors. In the calculation process, when the inputted expression portion is connected with a variable number by an equal sign, the variable number is also stored in the color copy buffer 120A in association with the expression portion. A variable number in the present embodiment consists of one character and included in an expression. Thus, the variable number also constitutes the expression portion.

The storage unit 13A stores a calculation program 130A according to the present invention. The calculation program 130A causes the CPU 11 to execute the calculation process (see FIG. 10) described below.

[2.2 Operation of Scientific Electronic Calculator]

The operation of the scientific electronic calculator 1A will now be described.

Figure 10:
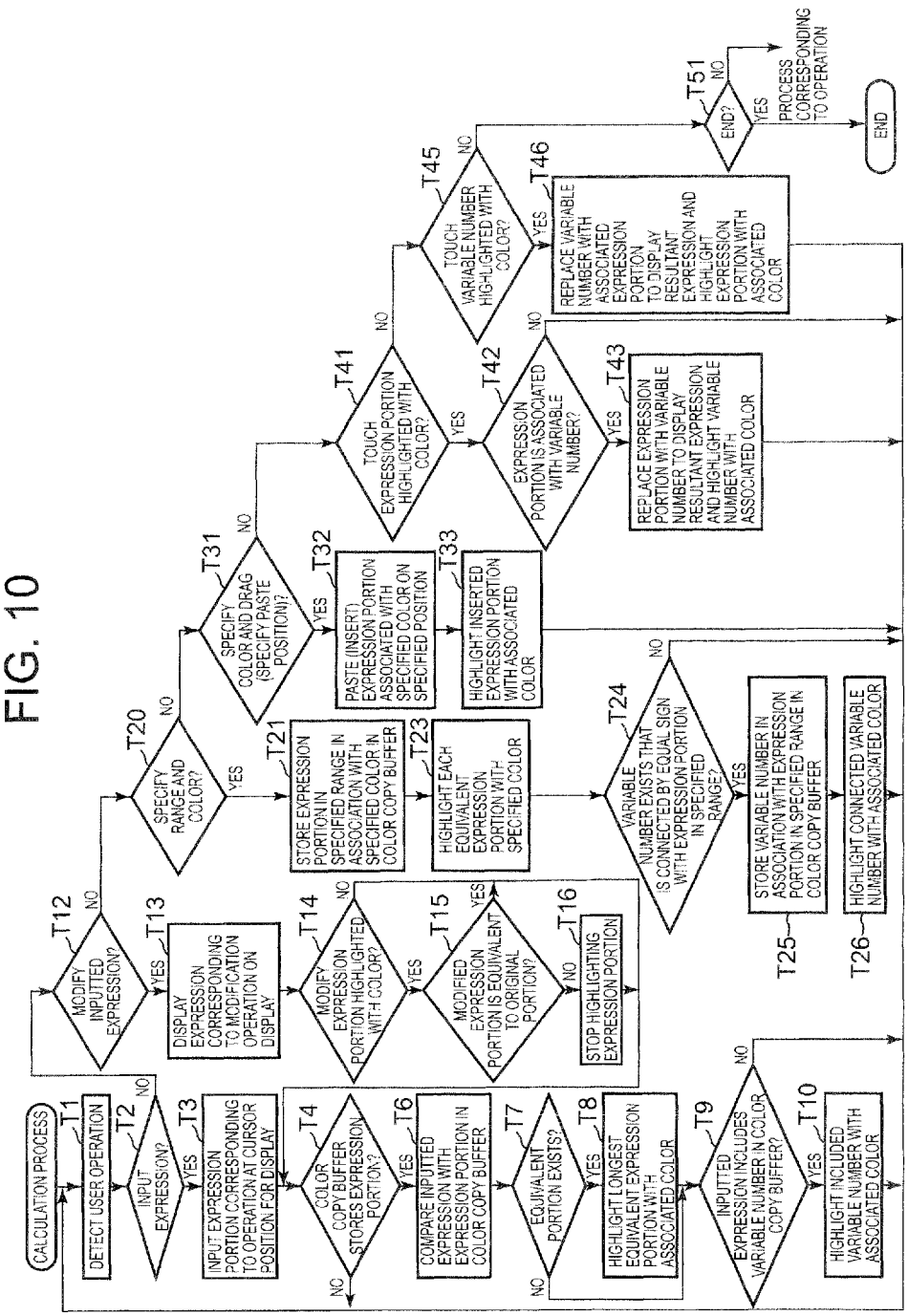
FIG. 10 is a flowchart illustrating the operation of a calculation process in the second embodiment.

FIG. 10 is a flowchart illustrating the operation of the calculation process. When a user inputs an execution command to perform the calculation process through the input unit 14, the calculation program 130A is read from the storage unit 13 and adequately expanded in the RAM 12A. As a result, the calculation process is executed through collaboration of the calculation program 130A with the CPU 11.

As illustrated in FIG. 10, in the calculation process, the CPU 11 displays a color chart 31 represented by the colors in the color copy buffer 120A on the display 3 while detecting a user operation (Step T1), and determines whether the detected user operation is an input operation of an expression (Step T2). In the present embodiment, the input operation of an expression does not include an edit (modification) operation of an expression.

If the user operation is an input operation of an expression in Step T2 (Step T2; Yes), the CPU 11 inputs an expression portion corresponding to the input operation to a cursor position on the display 3 and displays the portion on the display 3 (Step T3).

The CPU 11 then determines whether the color copy buffer 120A stores an expression portion (Step T4). If the color copy buffer 120A does not store an expression portion (Step T4; No), the process of the CPU 11 goes to Step T1.

If the color copy buffer 120A stores an expression portion (Step T4; Yes), the CPU 11 compares each expression portion extractable from an inputted expression with each expression portion stored in the color copy buffer 120A (Step T6).

The CPU 11 then determines whether there is an expression portion that is extractable from the inputted expression and that has the same value (equivalent) as an expression portion stored in the color copy buffer 120A (Step T7). If such an expression portion does not exist (Step T7; No), the process of the CPU 11 goes to Step T8 described below. In Step T7, the expression portion having the same value does not include a variable number.

If there is an expression portion that is extractable from an inputted expression and that has the same value (equivalent or the same content) as an expression portion stored in the color copy buffer 120A in Step T7 (Step T7; Yes), the CPU 11 detects a color associated in the color copy buffer 120A with the longest expression portion in the expression portion having the same value, and highlights the corresponding expression portion (the longest expression portion having the same value) in the inputted expression with the associated color (Step T8).

The CPU 11 then refers to each variable number stored in the color copy buffer 120A and determines whether any variable number is included in the inputted expression (Step T9). If the variable number is not included therein (Step T9; No), the process of the CPU 11 goes to Step T1.

If the variable number is included in the inputted expression in Step T9 (Step T9; Yes), the CPU 11 detects a color associated with the variable number in the color copy buffer 120A, highlights the variable number in the inputted expression with the associated color (Step T10). The process then goes to Step T1.

If the user operation is not an input operation of an expression in Step T2 (Step T2; No), the CPU 11 determines whether the user operation is an operation for modifying (editing) the expression (Step T12). In the present embodiment, the operation for modifying (editing) includes an operation of moving an expression portion within the inputted expression.

If the user operation is an operation for modifying (editing) an expression in Step T12 (Step T12; Yes), the CPU 11 displays an expression corresponding to the modification (editing) operation on the display 3 (Step T13).

The CPU 11 then determines whether an expression portion highlighted with a color (stored in the color copy buffer 120A) is modified (Step T14). If an expression portion highlighted with a color is not modified (Step T14; No), the process of the CPU 11 goes to Step T4.

If an expression portion highlighted with a color is modified (Step T14; Yes), the CPU 11 determines whether the modified expression portion has the same value (equivalent or the same content) as the expression portion before the modification (Step T15). If the modified expression portion has the same value as the expression portion before the modification (Step T15; Yes), the process of the CPU 11 goes to Step T4.

If the modified expression portion does not have the same value as the expression portion before the modification in Step T15 (Step T15; No), the CPU 11 stops highlighting the modified expression portion and updates the display content (Step T16), and then the process goes to Step T4. Herein, the case where the modified expression portion does not have the same value as the expression portion before the modification includes, for example, the case where a new symbol (including a character and a numeral) is inserted into the expression portion, or a part of the expression portion is moved and separated.

If the user operation is not an operation for modifying (editing) an expression in Step T12 (Step T12; No), the CPU 11 determines whether the user operation is an operation for specifying the range of an expression portion and specifying a display color from the color chart 31 (Step T20).

If the user operation is an operation for specifying a range and specifying a display color in Step T20 (Step T20; Yes), the CPU 11 stores in the color copy buffer 120A the expression portion in the specified range in association with the specified color (Step T21).

The CPU 11 then highlights both the expression portion selected as the specified range and an expression portion (not including a variable number equivalent to the selected expression portion) having the same content (the same value or equivalent) as the selected expression portion, among the expressions displayed on the display 3, with the specified color (Step T23). Accordingly, the expression portion selected as the specified range and an expression portion having the same content (the same value or equivalent) as the selected expression portion are highlighted with the color associated with the selected expression portion stored in the color copy buffer 120A.

The CPU 11 then determines whether a variable number, which is connected by an equal sign with the expression portion selected as the specified range, is inputted (Step T24). If such a variable number is not inputted (Step T24; No), the process of the CPU 11 goes to Step T1.

If a variable number, which is connected by an equal sign with the expression portion selected as the specified range, is inputted in Step T24 (Step T24; Yes), the CPU 11 stores in the color copy buffer 120A the variable number in association with the expression portion selected as the specified range (Step T25).

The CPU 11 then highlights the variable number with the color associated with the expression portion selected as the specified range (Step T26). The process then goes to Step T1. In more detail, the CPU 11 highlights the variable number connected by an equal sign with the expression portion selected as the specified range and highlights the same inputted variable number in Step T26.

If the user operation is not an operation for specifying a range and specifying a display color in Step T20 (Step T20; No), the CPU 11 determines whether the user operation is an operation for specifying a display color from the color chart 31 and dragging the color patch (or specifying a display color from the color chart 31 and specifying a paste position) (Step T31). In the present embodiment, when a display color is specified from the color chart 31 and the color patch is dragged, an expression portion corresponding to the color is pasted on the position specified by the dragging (end position of the dragging). Similarly, when a display color is specified from the color chart 31 and a paste position is specified, an expression portion corresponding to the color is pasted on the specified position.

If the user operation is an operation for specifying a color and dragging (or specifying a color and specifying a paste position) in Step T31 (Step T31; Yes), the CPU 11 pastes an expression portion associated with the specified color in the color copy buffer 120A to input (insert) the portion on the specified position (position specified by the dragging or the specifying of a paste position) (Step S32). When the user performs an operation of preparing for overwriting an inputted expression portion in Step T1, and specifies and drags a color (or specifies a color and a paste position) (for example, when the user selects an inputted expression portion as a specified range and then specifies and drags a color, or when the user selects an inputted expression portion as a specified range for a paste position and specifies a color), the CPU 11 replaces the expression portion selected as the specified range for the paste position, with an expression portion associated with the specified color in the color copy buffer 120A in Step T32.

The CPU 11 then highlights the pasted expression portion with a specified color, i.e., a color associated with the expression portion in the color copy buffer 120A (Step T33) The process then goes to Step T1.

If the user operation is not an operation for specifying a color and dragging (or specifying a color and specifying a paste position) in Step T31 (Step T31; No), the CPU 11 determines whether the user operation is an operation for specifying an expression portion highlighted with a color, for example, an operation of touching an expression portion highlighted with a color. (Step S41) In Step T41, the expression portion does not include a variable number.

If the user operation is an operation for specifying an expression portion highlighted with a color in Step T41 (Step T41; Yes), the CPU 11 determines whether the specified expression portion is associated with a variable number in the color copy buffer 120A (Step T42). If the specified expression portion is not associated (Step T42; No), the process of the CPU 11 goes to Step T1.

If the specified expression portion is associated with a variable number in the color copy buffer 120A in Step T42 (Step T42; Yes), the CPU 11 replaces the specified expression portion with the variable number and highlights the variable number with a color associated with the specified expression portion (Step T43). The process then goes to Step T1.

If the user operation is not an operation for specifying an expression portion highlighted with a color in Step T41 (Step T41; No), the CPU 11 determines whether the user operation is an operation for specifying a variable number highlighted with a color, for example, an operation of touching a variable number highlighted with a color. (Step S45).

If the user operation is an operation for specifying a variable number highlighted with a color in Step T45 (Step T45; Yes), the CPU 11 replaces the specified variable number with an expression portion associated with the variable number in the color copy buffer 120A, and highlights the expression portion with a color associated with the expression portion (Step T46). The process then goes to Step T1.

If the user operation is not an operation for specifying a variable number highlighted with a color in Step T45 (Step T45; No), the CPU 11 determines whether the user operation is an operation of ending (Step T51).

If the user operation is not an operation of ending in Step T51 (Step T51; No), the CPU 11 performs processing corresponding to the user operation. Conversely, if the user operation is an operation of ending in Step S51 (Step T51; Yes), the CPU 11 ends the calculation process.

[2.3 Operation Examples]

The operation of the scientific electronic calculator 1A will now be described in detail with reference to the accompanying drawings. In the accompanying drawings illustrating the following operation examples, characters in regions surrounded by dashed lines on the screen of the display 3 are displayed with colors ("Lb": Light blue, "B": Blue, "P": Pink, "R": Red, "Y": Yellow, "V": Violet, and "O": Orange) associated with the respective regions.

Operation Example 1

Figure 11A:
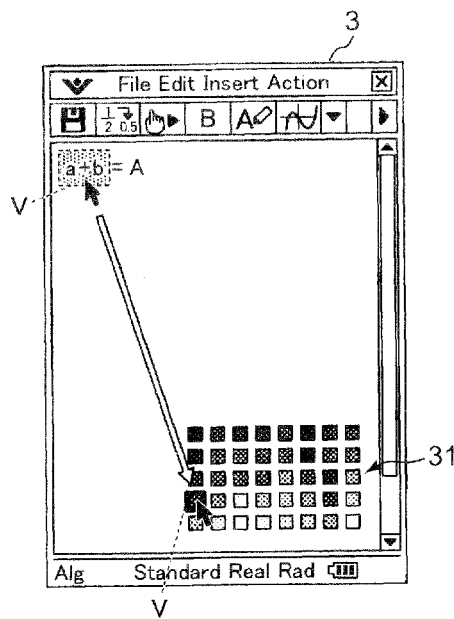
FIGS. 11A to 11D illustrate contents displayed on the display.

As illustrated in FIG. 11A, the calculation process is performed, and the color chart 31 then appears on the display 3.

The user then inputs an expression "a+b=A" (Step T2; Yes). The expression corresponding to the input operation appears at the cursor position on the display 3 (Step T3).

The user then specifies the range of the expression portion "a+b" and the display color "violet" in the color chart 31 (Step T20; Yes). The specified expression portion "a+b" is stored in the color copy buffer 120A in association with the specified color "violet" (Step T21).

The expression portion "a−b" set as the specified range among the expressions displayed on the display 3 is highlighted with the specified color "violet" (Step T23).

It is then determined that the variable number "A", which is connected by an equal sign with the expression portion "a+b" as the specified range, is inputted (Step T24; Yes). The variable number "A" is then stored in the color copy buffer 120A in association with the expression portion "a+b" as the specified range (Step T25).

Figure 11B:
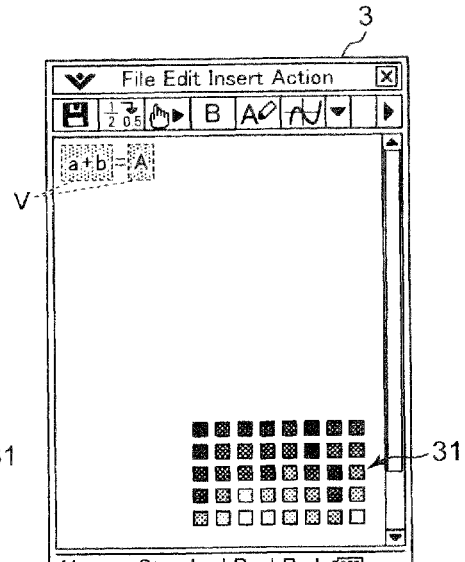

As illustrated in FIG. 11B, the variable number "A" is then highlighted with the color "violet" associated with the expression portion "a+b" as the specified range (Step 126).

Figure 11C:
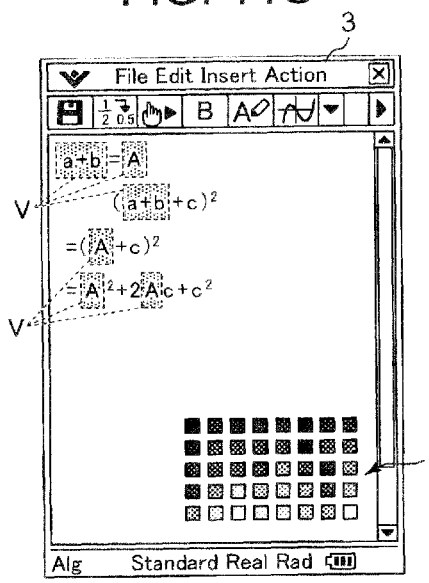

As illustrated in FIG. 11C, the user then inputs expressions "(a+b+c)$^2$", "=(A+c)$^2$", and "A$^2$+2Ac+c$^2$" (Step 12; Yes). The expressions corresponding to the input operation appear at the cursor position on the display 3 (Step T3).

Each expression portion extractable from the inputted expressions is then compared with each expression portion stored in the color copy buffer 120A (Step T6). It is then determined that expression portions extractable from the inputted expressions include the expression portion "a+b", which has the same value (equivalent) as an expression portion stored in the color copy buffer 120A (Step T7; Yes). The color "violet" associated with the expression portion "a+b" in the color copy buffer 120A is then detected, and the corresponding expression portion "a+b" in the inputted expressions "(a+b+c)$^2$", "=(A+c)$^2$", and "=A$^2$+2Ac+c$^2$" is highlighted with the associated color "violet" (Step T8).

Each variable number stored in the color copy buffer 120A is then referred to. It is then determined that the variable number "A" is included in the inputted expressions "(a+b+c)$^2$", "=(A+c)$^2$", and "=A$^2$+2Ac+c$^2$" (Step T9; Yes). The color "violet" associated with the variable number "A" in the color copy buffer 120A is then detected, and the variable number "A" is highlighted with the associated color "violet" (Step 110).

Figure 11D:
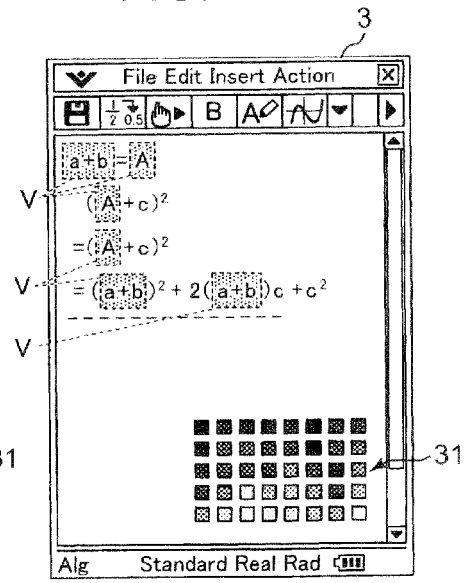

As illustrated in FIG. 11D, when the user touches the expression portion "a+b" highlighted with a color (here "a+b" on the second line) (Step T41; Yes), it is determined that the touched and specified expression portion "a+b" is associated with the variable number "A" in the color copy buffer 120A. (Step T42; Yes). The specified expression portion "a+b" is replaced with the variable number "A", and the variable number "A" is highlighted with the color "violet" associated with the expression portion "a+b" (Step T43).

As illustrated in FIG. 11C, the user touches the variable number "A" (in the second line) highlighted with a color (Step T45; Yes). The touched and specified variable number "A" is replaced with the expression portion "a+b" associated with the variable number "A" in the color copy buffer 120A. The expression portion "a+b" is highlighted with the color "violet" associated with the expression portion of "a+b" (Step T46).

Figure 12A:
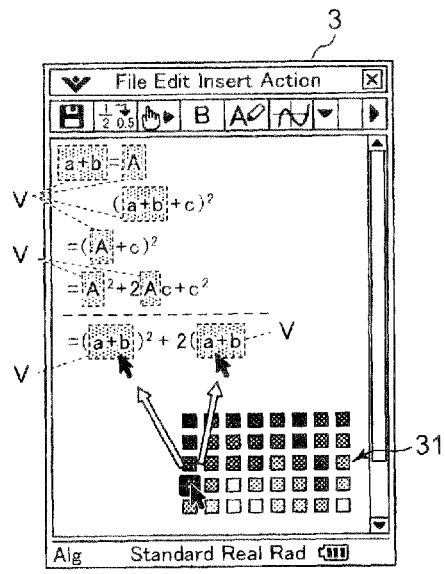
FIGS. 12A to 12D illustrate contents displayed on the display.

As illustrated in FIG. 12A, the user then inputs an expression "=(" (Step T2; Yes). The expression corresponding to the input operation appears at the cursor position on the display 3 (Step T3).

The user then specifies the display color "violet" from the color chart 31 and drags the color patch "violet" (Step T31; Yes). The expression portion "x+b" associated with the specified color "violet" in the color copy buffer 120 is pasted on the specified position to be inputted (inserted) (Step T32). Accordingly, an expression "=(a+b" is inputted to the fifth line on the display 3. The pasted expression portion "a+b" is then highlighted with the specified color "violet" (Step T33).

The user then inputs an expression ")$^2$+2(" (Step T2; Yes). The expression corresponding to the input operation appears at the cursor position on the display 3 (Step T3). Accordingly, an expression "=(a+b)$^2$+2(" is inputted to the fifth line on the display 3.

The user then specifies the display color "violet" from the color chart 31 and drags the color patch "violet" (Step T31; Yes). The expression portion "a+b" associated with the specified color "violet" in the color copy buffer 120A is pasted on the specified position to be inputted (inserted) (Step T32). Accordingly, an expression "=(a+b)$^2$+2(a+b" is inputted to the fifth line on the display 3. The pasted expression portion "a+b" is then highlighted with the specified color "violet" (Step T33).

Figure 12B:
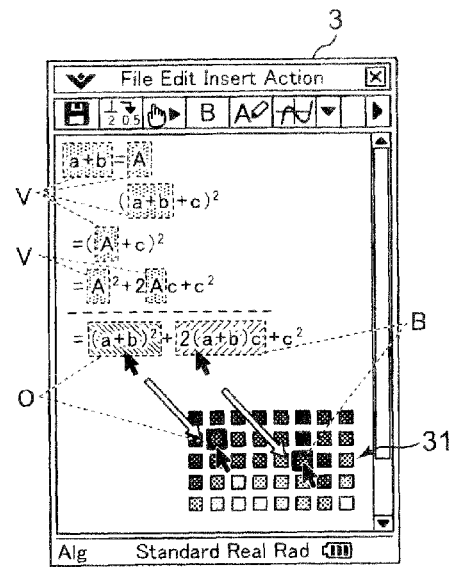

As illustrated in FIG. 12B, the user then inputs an expression ")c+c$^2$" (Step T2; Yes). The expression corresponding to the input operation appears at the cursor position on the display 3 (Step T3). Accordingly, an expression "=(a+b)$^2$+2(a+b)c+c$^2$" is inputted to the fifth line on the display 3.

The user then specifies the range of the expression portion "(a+b)$^2$" and the display color "orange" from the color chart 31 (Step T20; Yes). The specified expression portion "(a+b)$^2$" is stored in the color copy buffer 120A in association with the specified color "orange" (Step T21). The expression portion "(a+b)$^2$" set as the specified range among the expressions displayed on the display 3 is highlighted with the specified color "orange" (Step T23).

Similarly, the user then specifies the range of the expression portion "2(a+b)c" and specifies the display color "blue" from the color chart 31 (Step T20; Yes). The specified expression portion "2(a+b)c" is stored in the color copy buffer 120A in association with the specified color "blue" (Step T21). The expression portion "2(a+b)c" set as the specified range among the expressions displayed on the display 3 is highlighted with the specified color "blue" (Step T23).

Figure 12C:
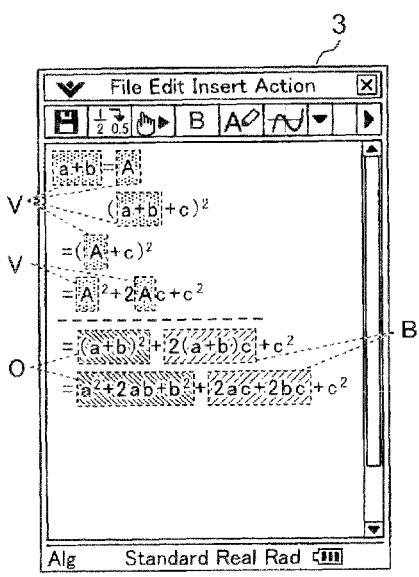
Figure 12D:
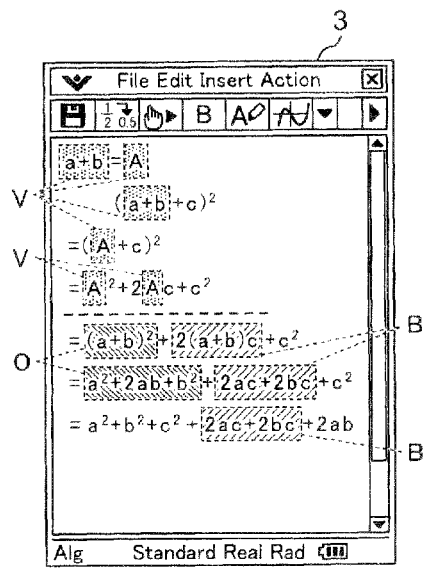

As illustrated in FIG. 12C, the user then inputs an expression "=a$^2$+2ab+b$^2$+2ac+2bc+c$^2$" to the sixth line in the displayed expressions (Step T2; Yes). The expression corresponding to the input operation appears at the cursor position on the display 3 (Step T3). In FIGS. 12C and 12D described below, the color chart 31 is omitted.

Each expression portion extractable from the inputted expressions is then compared with each expression portion stored in the color copy buffer 120A (Step T6). It is then determined that the expression portions extractable from the inputted expressions include the expression portions "a$^2$+2ab+b$^2$" and "2ac+2bc", which have the same value (equivalent) as an expression portion stored in the color copy buffer 120A (Step T7; Yes). The color "orange" associated with the expression portion "a$^2$+2ab+b$^2$" in the color copy buffer 120A is then detected, and the corresponding expression portion "a$^2$+2ab+b$^2$" in the inputted expressions is highlighted with the associated color "orange" (Step T8). Similarly, the color "blue" associated with the expression portion "2ac+2bc" in the color copy buffer 120A is then detected, and the corresponding expression portion "2ac+2bc" in the inputted expressions is highlighted with the associated color "blue" (Step T8).

The user then inputs the same expression as that in the sixth line to the seventh line (Step T2; Yes). The same expression as that in the sixth line appears in the seventh line (Steps T3 and T8).

As illustrated in FIG. 12D, the user then modifies (edits) an expression to rearrange the expression elements (Step T2; Yes). The expression "=a$^2$+b$^2$+c$^2$+2ac+2bc+2ab" corresponding to the modification operation appears on the display 3 (Step T13).

It is then determined that the expression portion "a$^2$+2ab+b$^2$" highlighted with the color is modified (Step 114; Yes), and that the expression portion "a$^2$+2ab+b$^2$" before the modification does not have the same value (equivalent or the same content) as the modified expression portions ("a$^2$+b$^2$" and "+2ab" in this example) (Step 115; No). The modified expression portions "a$^2$ b$^2$" and "+2ab" displayed with the color "orange" stops being highlighted, and the display content is updated (Step T16). At this time, it is determined that the expression before the modification includes the expression portion "2ac+2bc", which has the same value (equivalent or the same content) as the modified expression portions "2ac+2bc" (Step T15; Yes). The modified expression portion "2ac+2bc" continues being highlighted with the color "blue".

Operation Example 2

Figure 13A:
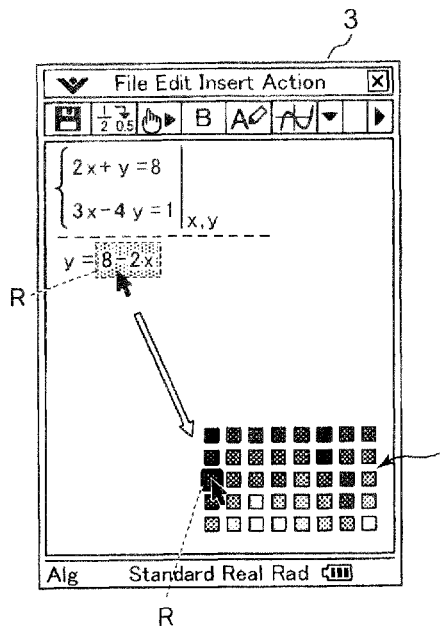
FIGS. 13A to 13D illustrate contents displayed on the display.

As illustrated in FIG. 13A, the calculation process is performed, and the color chart 31 then appears on the display 3.

The user then inputs the expressions of simultaneous equations "2x+y=8" and "3x−4y=1" for the variable numbers "x" and "y" (Step 12; Yes). The expressions corresponding to the input operation appear at the cursor position on the display 3 (Step T3).

In order to solve the simultaneous equations, the user then solves the first expression "2x+y=8" for "y" and inputs the expression "y=8−2x" to the third line (Step T2; Yes). The expression corresponding to the input operation appears at the cursor position on the display 3 (Step T3).

The user then specifies the range of the expression portion "8−2x" and the display color "red" from the color chart 31 (Step T20; Yes). The specified expression portion "8−2x" is stored in the color copy buffer 120A in association with the specified color "red" (Step T21).

The expression portion "8−2x", set as the specified range among the expressions displayed on the display 3, is highlighted with the specified color "red" (Step T23).

It is then determined that the variable number "y" connected by an equal sign with the expression portion "8−2x" as the specified range is inputted (Step T24; Yes). The variable number "y" is then stored in the color copy buffer 120A in association with the expression portion 8−2x" as the specified range (Step T25).

Figure 13B:
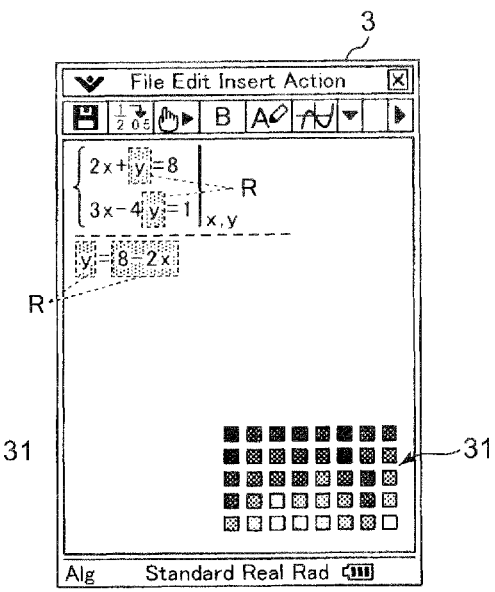

As illustrated in FIG. 13B, the variable number "y" is then highlighted with the color "red" associated with the expression portion "8−2x" as the specified range (Step T26).

Figure 13C:
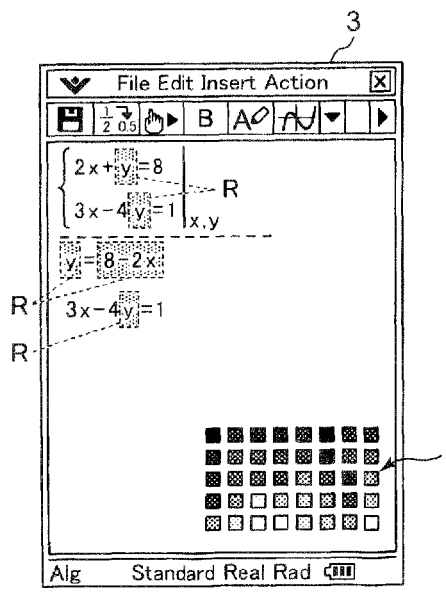

As illustrated in FIG. 13C, the user then inputs the second expression "3x−4y=1" again to the fourth line in the displayed expressions (Step T2; Yes). The expression corresponding to the input operation appears at the cursor position on the display 3 (Step T3).

Each variable number stored in the color copy buffer 120A is then referred to. It is then determined that the variable number "y" is included in the inputted expression "3x−4y=1" (Step T9; Yes). The color "red" associated with the variable number "y" in the color copy buffer 120A is then detected, and the variable number "y" is highlighted with the associated color "red" (Step T10).

Figure 13D:
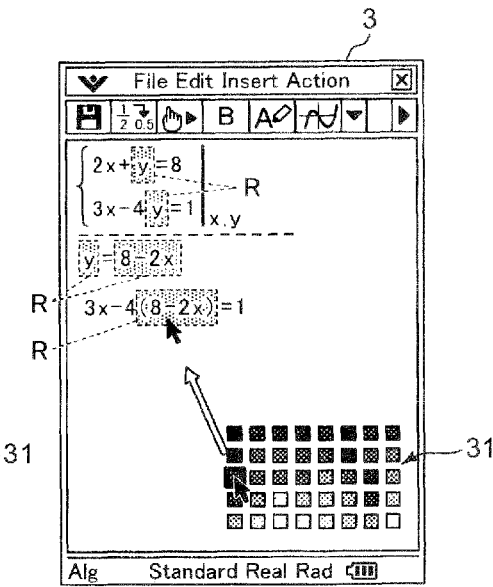

The user then selects the expression portion "y" in the inputted expression "3x−4y=1" as a specified range for a paste position and then specifies the color "red" from the color chart 31. As illustrated in FIG. 13D, the expression portion "y" selected as the specified range for the paste position is replaced with the expression portion "8−2x" associated with the specified color "red" in the color copy buffer 120A, and an expression "3x−4(8−2x)=1" appears in the fourth line (Step T32). Instead of this operation, if the user touches the variable number "y" (in the fourth line) highlighted with the color (Step T45; yes), the variable number "y" is then replaced with the expression portion "8−2x" associated with the variable number "y" in the color copy buffer 120A, and the expression portion "8−2x" is highlighted with the color "red" associated with the expression portion "8−2x" (Step T46). As a result, the same content as that in FIG. 13D appears.

Figure 14A:
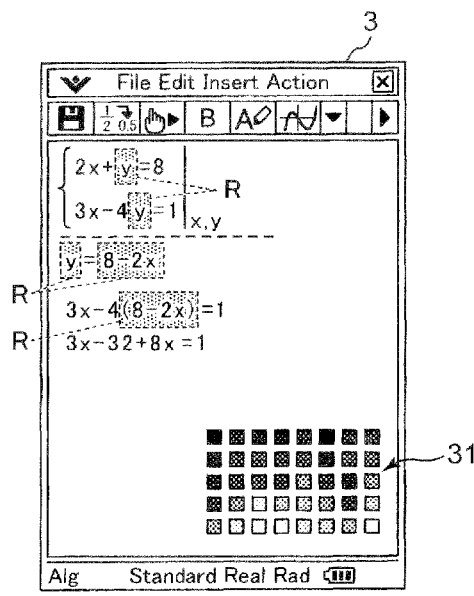
FIGS. 14A to 14D illustrate contents displayed on the display.
Figure 14B:
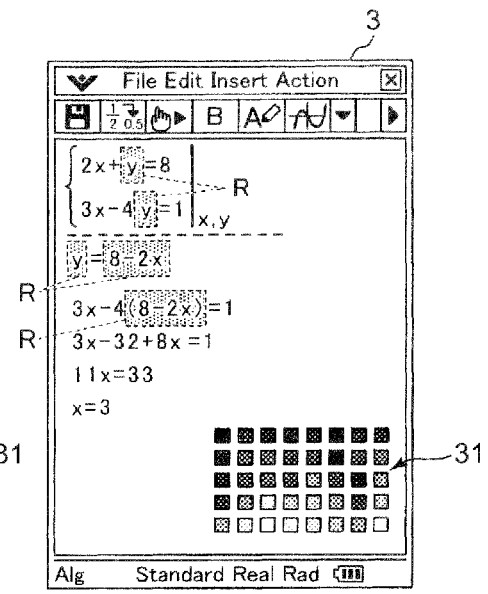

As illustrated in FIGS. 14A and 14B, the user then substitutes "y=8−2x" for the variable number "y" in the second expression "3x−4y=1" and inputs expressions "3x−32+8x=1", "11x"=33, and "x=3" for solving for "x" to the fifth to seventh lines (Step T2; Yes). The expressions corresponding to the input operation appear at the cursor position on the display 3 (Step T3).

Instead of inputting the expression "3x−32+8x=1" to the fifth line at this time, the user may input the expression "3x−4(8−2x)=1" in the fourth line again to the fifth line and may modify the expression "3x−4(8−2x)=1" in the fifth line to "3x−32+8x=1". This also causes the same content as that in FIG. 14A to appear. Specifically, instead of inputting the expression "3x−32+Br=1" to the fifth line, the user may input the expression "3x−4(8−2x)=1" in the fourth line again to the fifth line (Step T2; Yes). The expression identical to that in the fourth line appears in the fifth line (Steps T3 and T8). The user then modifies (edits) the expression to rearrange the expression elements (Step T12; Yes). The expression "3x−32+8x=1" corresponding to the modification operation appears on the display (Step T13). It is then determined that the expression portion "(8−2x)" highlighted with the color is modified (Step T14; Yes), and that the expression portion "(8−2x)" before the modification does not have the same value (equivalent or the same content) as the modified expression portions (for example, "Br") (Step 115; No). The modified expression portion such as "Hx" displayed with the color "red" stops being highlighted, and the display content is updated (Step T16).

Figure 14C:
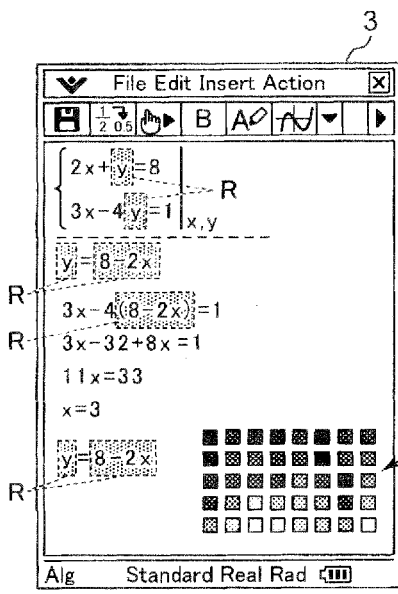

As illustrated in FIG. 14C, the user inputs again the expression "y=8−2x" (Step T2; Yes). The expression corresponding to the input operation appears at the cursor position on the display 3 (Step T3).

Each expression portion extractable from the inputted expressions is then compared with each expression portion stored in the color copy buffer 120A (Step T6). It is then determined that the expression portions extractable from the inputted expressions include the expression portion "8−2x", which has the same value (equivalent) as an expression portion stored in the color copy buffer 120A (Step T7; Yes). The color "red" associated with the expression portion "8−2x" in the color copy buffer 120A is then detected, and the corresponding expression portion "8−2x" in the inputted expression "y=8−2x" is highlighted with the associated color "red" (Step T8).

Each variable number stored in the color copy buffer 120A is then referred to. It is then determined that the variable number "y" is included in the inputted expression "y=8−2w" (Step T9; Yes) The color "red" associated with the variable number "y" in the color copy buffer 120A is then detected, and the variable number "y" is highlighted with the associated color "red" (Step 110).

Figure 14D:
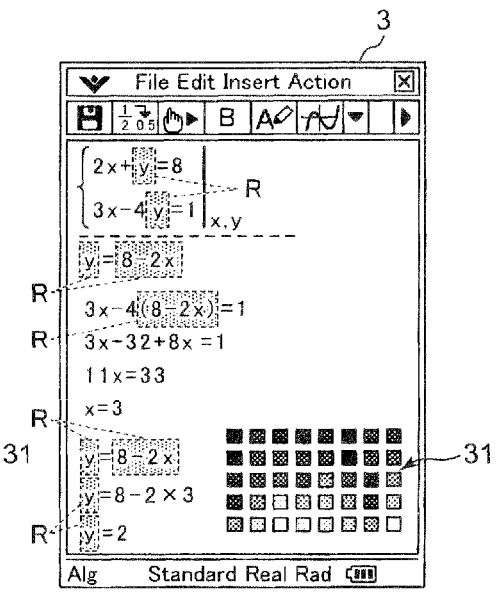

As illustrated in FIG. 14D, the user then substitutes "x=3" for the variable number "x" in the expression "y=8−2x" and inputs expressions "y=8−2×3" and "y=2" for solving for "y" (Step 12; Yes). The expressions corresponding to the input operation appear at the cursor position on the display 3 (Step T. Each variable number stored in the color copy buffer 120A is then referred to. It is then determined that the variable number "y" is included in the inputted expressions "y=8−2×3" and "y=2" (Step T9; Yes). The color "red" associated with the variable number "y" in the color copy buffer 120A is then detected, and the variable number "y" is highlighted with the associated color "red" (Step 110).

As described above, according to the present embodiment, as illustrated in, for example, Steps T20 to T23 and T31 to T33 of FIG. 10 and FIGS. 11A to 14D, the user specifies an expression portion among the expressions displayed on the display 3 and specifies a color from a plurality of colors. The specified expression portion is stored in the color copy buffer 120A in association with the specified color. The expression portion stored in the color copy buffer 120A is highlighted with the associated color, among the expressions displayed on the display 3. The user specifies a color associated with an expression portion in the color copy buffer 120A and specifies an input position for a new expression portion. Then, the expression portion associated with the specified color is pasted on the specified position, and the inputted expression portion is highlighted with the color associated therewith. Therefore, when there is an expression portion highlighted with a color among the expressions displayed on the display 3, the expression portion identical to the highlighted portion can be pasted on a specified position by specifying the color and specifying the input position. Accordingly, if plural expression portions displayed on the display 3 are copied, each of the copied expression portions can be pasted more easily than conventional techniques by specifying the color for highlighting the corresponding expression portion.

Further, as illustrated in, for example, Step T23 of FIG. 10 and FIGS. 11A to 14D, among the expressions displayed on the display 3, a first expression portion that has the same value as a second expression portion stored in the color copy buffer 120A is highlighted with the color associated with the second expression portion. This can clearly indicate which expression portion has the same value as that of another expression portion.

As illustrated in, for example, Step T16 of FIG. 10 and FIG. 12D, if an expression portion displayed on the display 3 is modified to have a different value from the original value, the modified expression portion stops being highlighted and the display content is updated. The expression portion having a different value from the original value thereby can be prevented from being highlighted with the same color as that associated with the original expression portion. This can also clearly indicate which expression portion has the same value as another expression portion.

As illustrated in, for example, Steps T10 and T26 of FIG. 10 and FIGS. 11B and 13B, if a variable number, which is connected by an equal sign with the expression portion stored in the color copy buffer 120A, is detected from an expression displayed on the display 3, the variable number is stored in association with the expression portion and the variable number displayed on the display 3 is highlighted with a color associated with the expression portion. This can clearly indicate a variable number having the same value as that of an expression portion.

As illustrated in, for example, Step T43 of FIG. 10 and FIG. 11D, if an expression portion highlighted on the display 3 is specified and if the specified portion is associated with a variable number, the expression portion is replaced with the variable number for display. This makes it easier to input a variable number having the same value as that of an expression portion.

As illustrated in, for example, Step T46 of FIG. 10 and FIG. 11D, if a variable number highlighted on the display 3 is specified and if the specified variable number is associated with an expression portion, the variable number is replaced with the expression portion for display. This makes it easier to input, an expression portion having the same value as that of a variable number.

The detailed configuration and detailed operation of each component of the scientific electronic calculators 1 and 1A according to the first and second embodiments can be modified adequately within the scope which does not deviate from the gist of the present invention.

For example, although the expression input apparatus according to the present invention has been described as the scientific electronic calculators 1 and 1A, the apparatus to which the present invention is applicable is by no means limited to such a product but the present invention is generally applicable to the electronic devices such as mobile telephones, personal computers, PDAs (Personal Digital assistant), and game machines. Furthermore, the calculation programs 130 and 130A according to the present invention may be stored in, for example, a memory card or a CD which is removable from the scientific electronic calculators 1 and 1A.

Figure 8A:
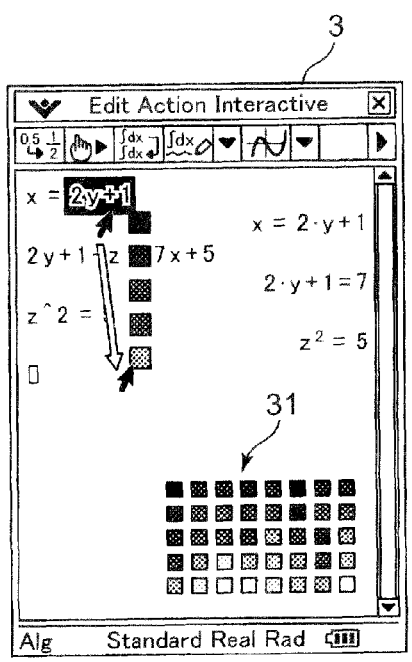
FIGS. 8A and 8B illustrate contents displayed on the display.
Figure 8B:
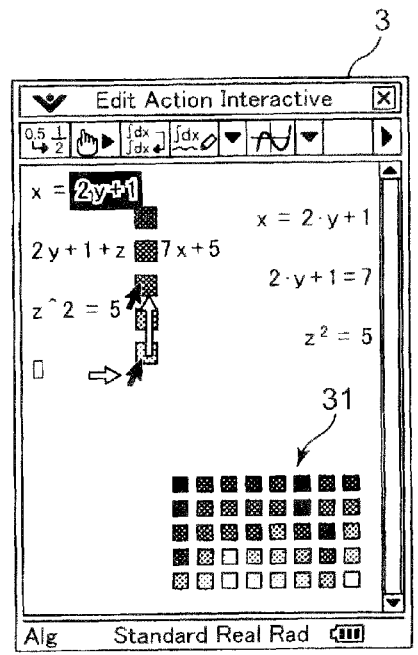

In the above description, when specifying a range of an expression portion and specifying a display color, the user specifies a color patch from the color chart 31. Alternatively, as illustrated in FIGS. 8A and 8B, each column of the color chart 31 may be extracted and enlarged near the expression portion set as the specified range, and a color may be specified from the enlarged color patches. FIG. 8A illustrates a status in which the leftmost column of the color chart 31 is enlarged near an expression portion "2y+1" when the expression portion is set as the specified range. FIG. 8B illustrates a status in which the column on the second left of the color chart 31 is enlarged when the user moves a pointer to the right in the status illustrated in FIG. 8A.

3. Third Embodiment

A third embodiment according to the present invention will now be described in detail with reference to the accompanying drawings. However, the scope of the invention is not limited to the illustrated embodiment.

[3.1 Configuration]

Figure 15:
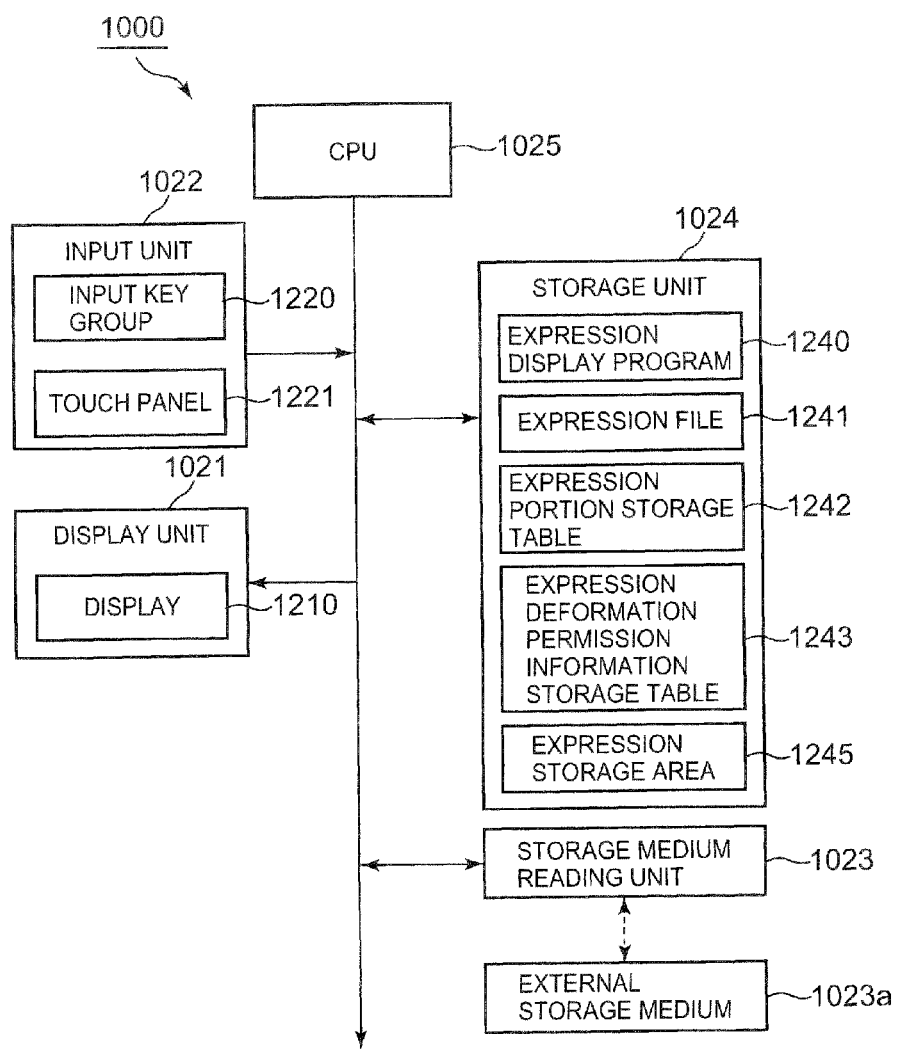
FIG. 15 is a schematic block diagram illustrating a functional configuration of a learning apparatus.

FIG. 15 is a block diagram illustrating a schematic configuration of a learning apparatus 1000 in the present embodiment.

As illustrated in FIG. 15, the learning apparatus 1000 in the present embodiment includes, for example, a display unit 1021, an input unit 1022, a storage medium reading unit 1023, a storage unit 1024, and a CPU 1025.

The display unit 1021 includes a display 1210 and displays various pieces of information on the display 1210 in response to a display signal inputted from the CPU 1025 on the display 1210. The display 1210 in the present embodiment is integrated with a touch panel 1221 and can accept a touch operation of a user.

The input unit 1022 includes a key group 1220 and the touch panel 1221 and outputs signals corresponding to a pressed key or a touched position in the touch panel 1221 to the CPU 1025.

The storage medium reading unit 1023 reads information from an external storage medium 1023a such as a SD card and records information on the external storage medium 1023a.

In the present embodiment, the external storage medium 1023a stores, for example, an expression file 1241. The expression file 1241 has a data structure similar to that of an expression file 1241 in the storage unit 1024 described later. Descriptions thereon will therefore be omitted.

The storage unit 1024 stores programs and data for various functions of the learning apparatus 1000 and functions as a work area for the CPU 1025. In the present embodiment, the storage unit 1024 stores, for example, an expression display program 1240, the expression file 1241, an expression portion storage table 1242, and an expression deformation permission information storage table 1243 according to the present invention. Further, the storage unit 1024 includes an expression storage area 1245.

The expression display program 1240 causes the CPU 1025 to execute an expression display process (see FIG. 17) described below.

The expression file 1241 stores a plurality of expressions. Expressions stored in the expression file 1241 include an expression group consisting of a plurality of expressions such as simultaneous equations.

As illustrated in FIGS. 16A and 16B, in the expression portion storage table 1242, an expression portion detected in a side of a replacement expression in the expression display process (see FIG. 17) described below is stored in association with a character to be replaced for one of the plurality of display forms (a marker color in the present embodiment). Herein, an expression portion means a portion of an expression, and may consist of one symbol (including a character and a numeral), may consist of two or more successive symbols, or may be an entire expression.

In the expression deformation permission information storage table 1243, a function to be performed in response to a gesture input in the expression display process (see FIG. 17) described below is stored in association with information whether the function is allowed or not. In the present embodiment, examples of the function to be performed in response to a gesture input, include functions to factorize an expression portion, expand an expression portion, and simplify terms in an expression. Furthermore, examples of the function to expand an expression portion include functions to expand the square of a binomial expression and the square of a trinomial expression. Whether the functions are permitted or not is switched and set by the user operation.

The expression storage area 1245 stores an expression to be displayed on the display 1210 in the expression display process (see FIG. 17) described below.

The CPU 1025 comprehensively controls each unit of the learning apparatus 1000. More specifically, the CPU 1025 expands a specified program among system programs and various application programs stored in the storage unit 1024, and executes various processes in collaboration with the expanded program.

[3.2 Expression Display Process]

The expression display process performed by the learning apparatus 1000 will now be described with reference to FIG. 17.

FIG. 17 is a flowchart illustrating the operation of the expression display process. When a user inputs an execution command to perform the expression display process through the input unit 1022, the expression display program 1240 is read from the storage unit 1024 and adequately expanded. As a result, the expression display process is executed through collaboration of the expression display program 1240 with the CPU 1025.

As illustrated in FIG. 17, in the expression display process, the CPU 1025 resets the expression storage area 1245 to delete an expression stored in the expression storage area 1245 (Step A1).

The CPU 1025 then determines whether the user operation is an operation for displaying an expression in the expression file 1241 (Step A2). If the user operation is an operation for displaying the expression (Step A2; Yes), the CPU 1025 receives an operation for specifying the expression in the expression file 1241 from the user (Step A3), and then displays the specified expression on the display 1210 (Step A4). The process then goes to Step A61 described below.

If the user operation is not an operation for displaying the expression in the expression file 1241 in Step A2 (Step A2; No), the CPU 1025 determines whether the user operation is an operation of inputting an expression (Step A11).

If the user operation is an operation of inputting an expression in Step A11 (Step A11; Yes), the CPU 1025 displays the inputted expression on the display 1210 (Step A12), and then the process goes to Step A61 described below.

If the user operation is not an operation of inputting an expression in Step A11 (Step A11; No), the CPU 1025 determines whether the user operation is an operation of setting an expression portion as a specified range in the displayed expression and dragging the expression portion (Step A21).

If the user operation is an operation of setting an expression portion as a specified range in the displayed expression and dragging the expression portion in Step A21 (Step A21; Yes), the CPU 1025 pastes the expression portion set as the specified range on the paste position as the end position of the dragging and displays the expression portion (Step A22) The process then goes to Step A61 described below. Further, if the expression portion set as the specified range is dragged downward in Step A22, the CPU 1025 pastes the expression portion on the paste position i.e., the end position of the dragging. On the other hand, if the expression portion set as the specified range is dragged to right or left, the expression portion is transposed within the expression, or the entire expression is divided by the expression portion.

If the user operation is not an operation of setting an expression portion as a specified range in the displayed expression and dragging the expression portion in Step A21 (Step A21; No), the CPU 1025 determines whether the user operation is an operation of clicking a character or an expression portion highlighted in Steps A66 and A68 described below (Step A23).

If the user operation is an operation of clicking a character or an expression portion highlighted in Step A23 (Step A23; Yes), the CPU 1025 refers to the expression portion storage table 1242 to replace the clicked character (or expression portion) with an expression portion (or character) associated with the clicked character (or expression portion) and displays the expression portion (or character) (Step A24). The process then goes to Step A61 described below.

If the user operation is not an operation of clicking a character or an expression portion highlighted in Step A23 (Step A23; No), the CPU 1025 determines whether the user operation is an operation of inputting a gesture of touching an expression portion in the displayed expression and moving to right (Step A25).

If the user operation is an operation of inputting a gesture of touching an expression portion in the displayed expression and moving to right in Step A25 (Step A25; Yes), the CPU 1025 refers to the expression deformation permission information storage table 1243 to determines whether the function to expand an expression portion is allowed for the touched expression portion (Step A26).

If the function to expand an expression portion is not allowed for the touched expression portion in Step A26 (Step A26; No), the process of the CPU 1025 goes to Step A11.

If the function to expand an expression portion is allowed for the touched expression portion in Step A26 (Step A26; Yes), the CPU 1025 expands the touched expression portion on the basis of an expansion formula for display (Step A27). The process then goes to Step A61 described below.

If the user operation is not an operation of inputting a gesture of touching an expression portion in the displayed expression and moving to right in Step A25 (Step A25; No), the CPU 1025 determines whether the user operation is an operation of inputting a gesture of moving downward from an inputted expression to another expression immediately below the inputted expression (Step A31).

If the user operation is an operation of inputting a gesture of moving downward from an inputted expression to another expression immediately below the inputted expression in Step A31 (Step A31; Yes), the CPU 1025 detects a calculation process not displayed between the two expressions and inserts and displays the detected calculation process between the two expressions (Step A32). The process then goes to Step A61 described below.

If the user operation is not an operation of inputting a gesture of moving downward from an inputted expression to another expression immediately below the inputted expression in Step A31 (Step A31; No), the CPU 1025 determines whether the user operation is an execution operation (for example, pressing the EXE key (not shown in the drawing)) (Step A33).

If the user operation is an execution operation in Step A33 (Step A33; Yes), the CPU 1025 determines whether the function to simplify an expression is allowed on the basis of the expression deformation permission information storage table 1243 (Step A34).

If the function to simplify an expression is not allowed in Step A34 (Step A34; No), the process of the CPU 1025 goes to Step A11.

If the function to simplify an expression is allowed in Step A34 (Step A34; Yes), the CPU 1025 simplifies terms in an expression inputted at the tail for display (Step A35). The process then goes to Step A61 described below. In the present embodiment, the CPU 1025 puts the same kinds of terms into one term and arranges the order of the terms in Step A35.

If the user operation is not an execution operation in Step A33 (Step A33; No), the CPU 1025 determines whether the user operation is another operation (Step A36). If the user operation is another operation (Step A36; Yes), the process goes to the other process. Otherwise (Step A36; No), the process goes to Step A11.

After the processes in Steps A4, A12, A22, A24, A27, A32, or A35, the CPU 1025 determines whether an expression newly inputted or deformed through the processes is a replacement expression of a character and an expression portion (Step A61). If the expression portion is not the replacement expression (Step A61; No), the process goes to Step A65 described below. Herein, the replacement expression of a character and an expression portion is defined as an equation where a character is connected by an equal sign with an expression portion, such as "a+b=A" and "y=8−2x".

If the expression is a replacement expression of a character and an expression portion in Step A61 (Step A61; Yes), the CPU 1025 determines whether an expression portion having the same value as the expression portion in the replacement expression is stored in the expression portion storage table 1242 (Step A62). If the expression portion is stored (Step A62; Yes), the process goes to Step A65 described below. In the present embodiment, examples of the expression portion having the same value includes expression portions "a+b" and "(a+b)" and expression portions before and after deformation such as factorization.

If the expression portion having the same value as the expression portion in the replacement expression is not stored in the expression portion storage table 1242 in Step A62 (Step A62; No), the CPU 1025 stores, in the expression portion storage table 1242, the expression portion and the character in the respective sides of the replacement expression in association with a marker color (Step A63).

The CPU 1025 then refers to each character stored in the expression portion storage table 1242 (hereinafter referred to as a registered character), and determines whether a registered character is included in the displayed expression (Step A65). If the registered character is not included therein (Step A65; No), the process goes to Step A67 described below.

If the registered character is included in the displayed expression in Step A65 (Step A65; Yes), the CPU 1025 detects a marker color associated with the registered character in the expression portion storage table 1242, and highlights the registered character with the associated color (Step A66).

The CPU 1025 then refers to each expression portion stored in the expression on portion storage table 1242 (hereinafter referred to as a registered expression portion), and determines whether a registered expression portion is included in the displayed expression (Step A67). If the registered expression portion is not included therein (Step A67; No), the process goes to Step A11. In the process of Step A67 in the present embodiment, the CPU 1025 also determines whether an expression portion having the same value as the registered expression portion is included in the displayed expression. If the registered expression portion or an expression portion having the same value is not included therein, the process goes to Step A11.

If a registered expression portion or an expression portion having the same value as a registered expression portion is included in the displayed expression (Step A67; Yes), the CPU 1025 detects a marker color associated with the registered expression portion in the expression portion storage table 1242, and highlights the registered expression portion and the expression portion having the same value with the associated color (Step A68). The process then goes to Step A11.

[3.3 Operation Examples]

The operation of the learning apparatus 1000 will now be described in detail with reference to the accompanying drawings. In the following operation example, the expression deformation permission information storage table 1243 stores information of permission for a function to simplify an expression, information of permission for a function to expand the square of a binomial expression, and information of non-permission for a function to expand the square of a trinomial expression. In the accompanying drawings illustrating the following operation examples, shaded regions on the screen of the display 1210 indicate that character in the regions are highlighted with markers. The different kinds of shaded areas indicate the characters highlighted with different marker colors.

Operation Example 1

Figure 18A:
FIGS. 18A to 18H illustrate contents displayed on the display.

As illustrated in FIG. 18A, after the expression display process is performed, the user inputs an expression "x+b=A" (Step A11; Yes). The expression "a+b=A" then appears on the display 1210 (Step A12).

It is then determined that the inputted expression "a+b=A" is a replacement expression of a character "A" and an expression portion "a+b" (Step A61; Yes), and that an expression portion having the same value as the expression portion "a+b" in the replacement expression is not stored in the expression portion storage table 1242 (Step A62; No). As illustrated in the first row in FIG. 16A, the expression portion "a+b" and the character "A" in the respective sides of the replacement expression are then stored in association with a marker color "red" in the expression portion storage table 1242 (Step A63).

As illustrated in FIG. 18A, it is then determined that the registered character "A" is included in the displayed expression "a+b=A" (Step A65; Yes). A marker color "red" associated with the registered character "A" is detected in the expression portion storage table 1242, and the registered character "A" is highlighted with the associated marker color "red" (Step A66).

It is then determined that the registered expression portion "a+b" is included in the displayed expression (Step A67; Yes) A marker color "red" associated with the registered expression portion "a+b" is detected in the expression portion storage table 1242, and the registered expression portion "a+b" is highlighted with the associated marker color "red" (Step A68).

Figure 18B:
Figure 18C:

As illustrated in FIG. 18B, the user then inputs an expression "=(a+b+c)$^2$". The expression "=(a+b+c)$^2$" then appears on the display 1210 (Step A12).

It is then determined that the registered expression portion "a+b" is included in the displayed expression "=(a+b+c)$^2$" (Step A67; Yes). A marker color "red" associated with the registered expression portion "a+b" is detected in the expression portion storage table 1242, and the registered expression portion "a+b" is highlighted with the associated marker color "red" (Step A68).

If the user clicks the highlighted expression portion "a+b" (Step A23; Yes), the clicked expression portion "a+b" is replaced with the character "A" associated with the expression portion "a+b" for display, as illustrated in FIG. 18O (Step A24).

It is then determined that the registered character "A" is included in the displayed expression "=(A+c)$^2$" (Step A65; Yes). A marker color "red" associated with the registered character "A" is detected in the expression portion storage table 1242, and the registered character "A" is highlighted with the associated marker color "red" (Step A66).

Figure 18D:
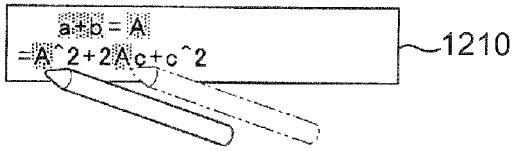

If the user inputs a gesture of touching an expression portion "(A+c)$^2$" in the displayed expression "=(A+c)$^2$" and moving to right (Step A25; Yes), and if it is determined that the function to expand the touched expression portion is allowed (Step A26; Yes), the expression portion "(A+c)$^2$" is expanded on the basis of an expansion formula for display, as illustrated in FIG. 18D (Step A27).

It is then determined that the registered character "A" is included in the displayed expression "=A$^2$+2Ac+c$^2$" (Step A65; Yes). A marker color "red" associated with the registered character "A" is detected in the expression portion storage table 1242, and the registered character "A" is highlighted with the associated marker color "red" (Step A66).

Figure 18E:
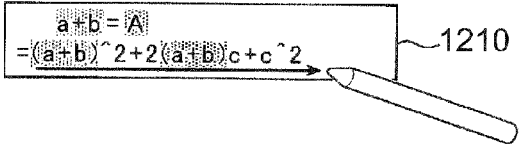

If the user clicks the highlighted character "A" (Step A23; Yes), the clicked character "A" is replaced with the expression portion "x+b" associated with the character "A" for display, as illustrated in FIG. 18E (Step A24).

It is then determined that the registered expression portion "a+b" is included in the displayed expression "=(a+b)$^2$+(a+b)c+c$^2$" (Step A67; Yes). A marker color "red" associated with the registered expression portion "a+b" is detected in the expression portion storage table 1242, and the registered expression portion "a+b" is highlighted with the associated marker color "red" (Step A68).

Figure 18F:
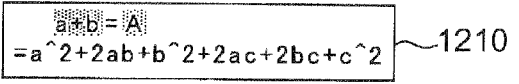

If the user inputs a gesture of touching an expression portion "(a+b)$^2$+2(a+b)c+c$^2$" in the displayed expression "=(a+b)$^2$+2(a+b)c+c$^2$" and moving to right. (Step A25; Yes), and if it is determined that the function to expand the touched expression portion is allowed (Step A26; Yes), the expression portion "(a+b)$^2$+2(a+b)c+c$^2$" is expanded on the basis of an expansion formula for display, as illustrated in FIG. 18F (Step A27).

Figure 18G:
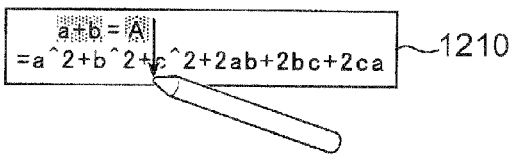

If the user performs an execution operation (Step A33; Yes), and if it is determined that the function to simplify an expression is allowed (Step A34; Yes), terms in an expression inputted at the tail are simplified for display, as illustrated in FIG. 18G (Step A35).

Figure 18H:
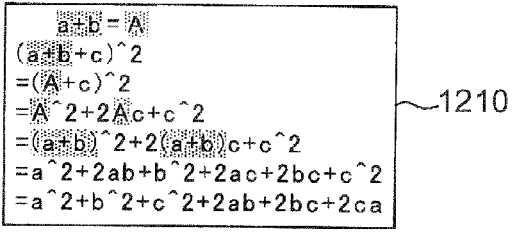

If the user then inputs a gesture of moving downward from the inputted expression "a+b=A" to another expression immediately below the inputted expression (Step A31; Yes), a calculation process not displayed between the two expressions appears between the two expressions, as illustrated in FIG. 18H (Step A32).

It is then determined that the registered character "A" is included in the displayed expression (Step A65; Yes). A marker color "red" associated with the registered character "A" is detected in the expression portion storage table 1242, and the registered character "A" is highlighted with the associated marker color "red" (Step A66). Further, it is determined that the registered expression portion "a+b" is included in the displayed expression (Step A67; Yes). A marker color "red" associated with the registered expression portion "a+b" is detected in the expression portion storage table 1242, and the registered expression portion "a+b" is highlighted with the associated marker color "red" (Step A68).

In this operation example, the user inputs the expressions on and below the second line. Alternatively, every time the user begins a new line, an expression in the last line may be copied and displayed on the new line. The user may thereby deform and modify the copied expression to input the expressions on the second and subsequent lines.

Operation Example 2

Figure 19A:
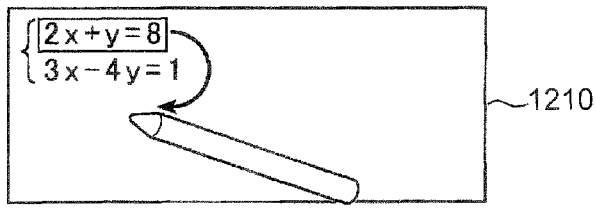
FIGS. 19A to 19F illustrate contents displayed on the display.

As illustrated in FIG. 19A, after the expression display process is performed, the user displays an expression in the expression file 1241 (Step A2; Yes), and then specifies expressions "2x+y=8, 3x−4y=1" of simultaneous equations in the expression file 1241 (Step A3). The specified expressions then appear on the display 1210 (Step A4).

Figure 19B:
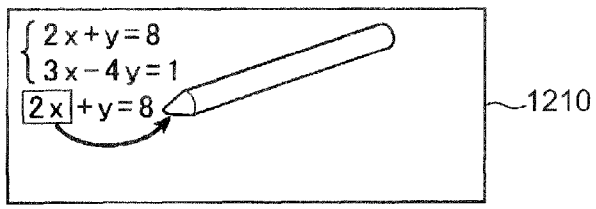

If the user then sets an expression portion "2x+y=8" in the displayed expressions as a specified range and drags the expression portion to a blank area below on the display 1210 (Step A21; Yes), the expression portion "2x+y=8" set as the specified range is pasted on the end position of the dragging for display, as illustrated in FIG. 19B (Step A22). The frame surrounding the expression portion "2x+y=8" in FIG. 19A indicates that the expression portion in the frame is set as the specified range.

If the user then sets an expression portion "2x" in the displayed expression "2x+y=8" as a specified range and drags the expression portion to a right blank area on the display 1210 (Step A21; Yes), the expression portion "2x" set as the specified range is transposed to the end position of the dragging for display, as illustrated in FIG. 19C (Step A22).

It is then determined that the inputted expression "y=8−2x" is a replacement expression of a character "y" and an expression portion "8−2x" (Step A61; Yes), and that an expression portion having the same value as the expression portion "8−2x" in the replacement expression is not stored in the expression portion storage table 1242 (Step A62; No). As illustrated in the first row in FIG. 16B, the expression portion "8−2x" and the character "y" in the respective sides of the replacement expression are then stored in association with a marker color "red" in the expression portion storage table 1242 (Step A63).

Figure 19C:
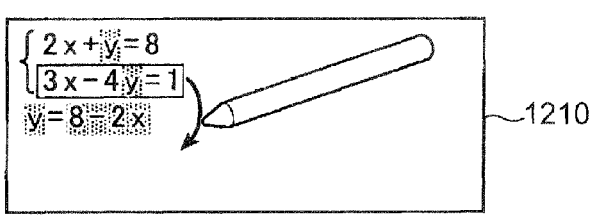

As illustrated in FIG. 19C, it is then determined that the registered character "y" is included in the displayed expressions "2x+y=8", "3x−4y=1", and "y=8−2x" (Step A65; Yes). A marker color "red" associated with the registered character "y" is detected in the expression portion storage table 1242, and the registered character "p" is highlighted with the associated marker color "red" (Step A66).

It is then determined that the registered expression portion "8−2x" is included in the displayed expression "y=8−2x" (Step A67; Yes). A marker color "red" associated with the registered expression portion "8−2x" is detected in the expression portion storage table 1242, and the registered expression portion "8−2x" is highlighted with the associated marker color "red" (Step A68).

Figure 19D:
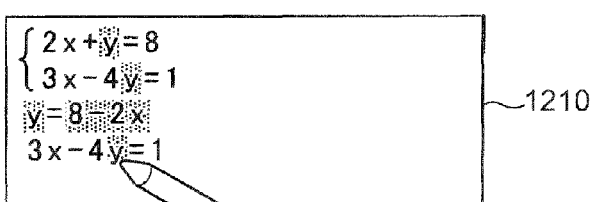

If the user sets an expression portion "3x−4y=1" in the displayed expression as a specified range and drags the expression portion to a blank area below on the display 1210 (Step A21; Yes), the expression portion "3x−4y=1" set as the specified range is pasted on the end position of the dragging for display, as illustrated in FIG. 19D (Step A22).

It is then determined that the registered character "y" is included in the displayed expressions "3x−4y=1", . . . (Step A65; Yes). A marker color "red" associated with the registered character "y" is detected in the expression portion storage table 1242, and the registered character "y" is highlighted with the associated marker color "red" (Step A66).

Figure 19E:
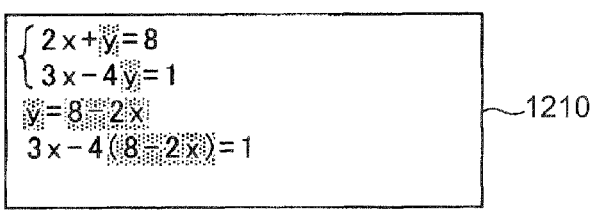

If the user clicks the highlighted character "y" (Step A23; Yes), the clicked character "y" is replaced with the expression portion "8−2x" associated with the character "y" for display, as illustrated in FIG. 19E (Step A24).

It is then determined that the registered expression portion "8−2x" is included in the displayed expression "3x−4 (8−2x)=1" (Step A67; Yes). A marker color "red" associated with the registered expression portion "8−2x" is detected in the expression portion storage table 1242, and the registered expression portion "8−2x" is highlighted with the associated marker color "red" (Step A68).

Figure 19F:
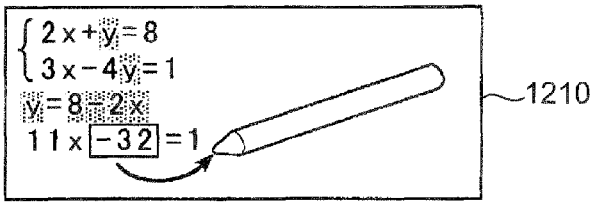

If the user performs an execution operation (Step A33; Yes), and if it is determined that the function to simplify an expression is allowed (Step A34; Yes), the terms in the expression "3x−4(8−2x)=1" inputted at the tail are simplified into "11x−32=1" for display, as illustrated in FIG. 19F (Step A35).

If the user then sets an expression portion "−32" in the displayed expression "11x−32=1" as a specified range and drags the expression portion to a right blank area on the display 1210 (Step A21; Yes), the expression portion "−32" set as the specified range is transposed to the end position of the dragging for display, as illustrated in FIG. 20A (Step A22).

If the user performs an execution operation (Step A33; Yes), and if it is determined that the function to simplify an expression is allowed (Step A34; Yes), the terms in the expression "11x=1+32" inputted at the tail are simplified into "11x=33" for display, as illustrated, in FIG. 20B (Step A35).

If the user then sets an expression portion "11" in the displayed expression "11x=33" as a specified range and drags the expression portion to a right blank area on the display 1210 (Step A21; Yes), the entire expression "11x=33" is divided by the expression portion "11" to display an expression "x=3", as illustrated in FIG. 20C (step A22).

It is then determined that the expression "x=3" is a replacement expression of a character "x" and an expression portion "3" (Step A61; Yes), and that an expression portion having the same value as the expression portion "3" in the replacement expression is not stored in the expression portion storage table 1242 (Step A62; No). As illustrated in the second row in FIG. 16B, the expression portion "3" and the character "x" in the respective sides of the replacement expression are then stored in association with a marker color "blue" in the expression portion storage table 1242 (Step A63).

As illustrated in FIG. 20D, it is then determined that the registered character "x" is included in the displayed expressions "2x+y=8", (Step A65; Yes). A marker color "blue" associated with the registered character "x" is detected in the expression portion storage table 1242, and the registered character "x" is highlighted with the associated marker color "blue" (Step A66).

If the user sets an expression portion "y=8−2x" in the displayed expression as a specified range and drags the expression portion to a blank area below on the display 1210 (Step A21; Yes), the expression portion "y=8−2x" set as the specified range is pasted on the end position of the dragging for display, as illustrated in FIG. 20E (Step A22).

It is then determined that the registered characters "y" and "x" are included in the displayed expressions (Step A65; Yes). Slacker colors "red" and "blue" associated with the registered characters "y" and "x", respectively, are detected in the expression portion storage table 1242, and the registered characters "y" and "x" is highlighted with the associated marker colors "red" and "blue", respectively (Step A66).

If the user clicks the highlighted character "x" (Step A23; Yes), the clicked character "x" is replaced with the expression portion "3" associated with the character "x" for display, as illustrated in FIG. 20F (Step A24).

If the user performs an execution operation (Step A33; Yes), and if it is determined that the function to simplify an expression is allowed (Step A34; Yes), the terms in an expression "y=8−2×3" inputted at the tail are simplified into "y=1" for display, as illustrated in FIG. 20G (Step A35).

As described above, according to the present embodiment, as illustrated in, for example, Steps A61 to A68 of FIG. 17 and FIGS. 18A to 20G, when a replacement expression of a character and an expression portion is detected, the character and the expression portion on the respective sides of the replacement expression is stored in the storage table 1242, with the character and, the expression portion being associated with each other. The expression portion and the character stored in the expression portion storage table 1242 are then detected from a displayed expression and are highlighted. This can clearly indicate which character may be replaced with which expression portion. This also makes it easier to calculate by replacing a character with an expression portion or by replacing an expression portion with a character.

Further, as illustrated in, for example, Steps A67 and A68 of FIG. 17, an expression portion having the same value an expression portion stored in the expression portion storage table 1242 is detected from a displayed expression and is highlighted. This can clearly indicate the relationship between a character and an expression portion connected by an equal sign with the character in the replacement expression, even if the expression portion is deformed.

The detailed configuration and detailed operation of each component of the learning apparatus 1000 according to the present embodiment can be modified adequately within the scope which does not deviate, from the gist of the present invention.

For example, although an expression display apparatus according to the present invention has been described as the learning apparatus 1000, the apparatus to which the present invention is applicable is by no means limited to such a product, but the present invention is generally applicable to the electronic devices such as scientific electronic calculators, mobile telephones, personal computers, personal digital assistants (PDAs), and game machines. Furthermore, the expression display program 1240 according to the present invention may be stored in, for example, a memory card or a CD which is removable from the learning apparatus 1000.

In the above description, an expression portion and a character detected from the respective sides of a replacement expression are highlighted with the same marker color. Alternatively, other display forms such as a display color and a kind of underline may be employed for the highlighting.

The scope of the present invention is not limited to the embodiments described herein, but is claimed in the accompanying claims, and includes the scope of equivalents thereof.

The entire disclosures of Japanese Patent Applications No. 2011-139034 filed on Jun. 23, 2011; No. 2011-252160 filed on Nov. 18, 2011; and No. 2011-284626 filed on Dec. 27, 2011, each including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An expression input apparatus comprising:
an expression display unit that displays an expression;
an expression-and-color registering unit that registers (i) an expression portion specified by a user as a range to be copied in the displayed expression and (ii) a color specified by the user, with the expression portion and the color being associated with each other;
an expression highlighting control unit that highlights each of (i) the registered expression portion and (ii) an expression portion equivalent to the registered expression portion, in the expression displayed on the expression display unit, with the color registered in association with the registered expression portion;
a color-and-position specifying unit that, based on an operation by the user, specifies (i) the color registered in association with the registered expression portion, and (ii) a paste position on the expression display unit; and
a pasting unit that pastes the registered expression portion, which is registered by the expression-and-color registering unit in association with the specified color, on the specified paste position, and highlights the pasted registered expression portion with the specified color;
wherein the expression displayed on the expression display unit includes the registered expression portion and a variable number connected with the registered expression portion by an equal sign; and
wherein the expression input apparatus further comprises:
an expression-and-variable registering unit that registers the variable number connected with the registered expression portion by the equal sign in association with the registered expression portion as the specified range; and
a variable highlighting control unit that highlights, in the expression displayed on the expression display unit, the registered variable number with the color registered by the expression-and-color registering unit in association with the registered expression portion.

2. The expression input apparatus according to claim 1, further comprising:
a variable number specifying unit that specifies the variable number highlighted by the variable highlighting control unit on the expression display unit based on an operation by the user; and
a replaced expression highlighting control unit that replaces the variable number specified by the variable number specifying unit with the expression portion registered by the expression-and-variable registering unit in association with the specified variable number, and displays the expression portion after the replacement to be highlighted with the same color as the color associated with the specified variable number.

3. The expression input apparatus according to claim 1, further comprising:
an expression portion specifying unit that specifies the expression portion highlighted by the expression highlighting control unit on the expression display unit based on an operation by the user;
a determining unit that determines whether a variable number is registered by the expression-and-variable registering unit in association with the expression portion specified by the expression portion specifying unit; and
a replaced-variable highlighting control unit that, when the determining unit determines that the variable number is registered in association with the specified expression portion, replaces the expression portion specified by the expression portion specifying unit with the variable number registered in association with the specified expression portion, and displays the variable number after the replacement to be highlighted with the same color as the color associated with the specified expression portion.

4. The expression input apparatus according to claim 1, further comprising:
an expression modifying unit that modifies the expression displayed on the expression display unit based on an operation by the user; and
a highlighting-stopping unit that stops highlighting the registered expression portion, which has been highlighted by the expression highlighting control unit, on the expression display unit and that controls the expression display unit to update a display content thereof when the highlighted registered expression portion is modified by the expression modifying unit and, as a result, is no longer equivalent to the registered expression portion before the modification.

5. The expression input apparatus according to claim 1, further comprising:
an expression modifying unit that modifies the expression displayed on the expression display unit based on an operation by the user; and
a modified-expression-and-color registering unit that, when the registered expression portion highlighted on the expression display unit is modified by the expression modifying unit, registers in a copy buffer the modified expression portion in association with a color from among a plurality of colors, the color being different from the color registered in association with the registered expression portion by the expression-and-color registering unit before the modification.

6. An expression display apparatus comprising:
an expression display unit that displays an expression including an expression portion and a variable number connected with the expression portion by an equal sign;
a registering unit that registers the expression portion and the variable number connected with the expression portion by the equal sign in the displayed expression, the expression portion and the variable number being registered in association with a color;
an expression-and-variable highlighting control unit that highlights, in the expression displayed on the expression display unit, each of the expression portion and the variable number connected with the expression portion by the equal sign which are registered by the registering unit, with the associated color registered by the registering unit; and a replaced expression highlighting control unit that, when the variable number highlighted by the expression-and-variable highlighting control unit is operated by a user, replaces the operated variable number with the corresponding expression portion, and highlights the expression portion after the replacement on the expression display unit with the same color as the color associated with the corresponding variable number.

7. The expression display apparatus according to claim 6, further comprising a replaced variable highlighting control unit that, when the expression portion highlighted by the expression-and-variable highlighting control unit is operated by the user, replaces the operated expression portion with the corresponding variable number, and highlights the variable number after the replacement on the expression display unit with the same color as the color associated with the corresponding expression portion.

8. The expression display apparatus according to claim 6, further comprising:
   a pointing device that receives an operation by the user;
   an expression deformation control unit that factorizes or expands the expression portion displayed on the expression display unit in response to a gesture input from the user through the pointing device to the expression portion, and that displays a resultant expression portion; and
   an expression deformation permission storage unit that stores information of permission or non-permission for a process to be performed by the expression deformation control unit, the permission or non-permission being switchable based on an operation by the user,
   wherein the expression deformation control unit performs the process only when the expression deformation permission storage unit stores the information of permission.

9. The expression display apparatus according to claim 6, further comprising:
   an expression simplification control unit that simplifies terms in the expression displayed on the expression display unit and that displays a resultant expression, based on an operation by the user; and
   an expression simplification permission storage unit that stores information of permission or non-permission for a process to be performed by the expression simplification control unit, the permission or non-permission being switchable based on an operation by the user,
   wherein the expression simplification control unit performs the process only when the expression simplification permission storage unit stores the information of permission.

10. An expression input method for an expression input apparatus, the expression input apparatus comprising an expression display unit that displays an expression, a copy buffer, and an input unit that receives an operation by a user, and the method comprising:
   registering, in the copy buffer, (i) an expression portion specified by the user through the input unit as a range to be copied in the displayed expression, and (ii) a color specified by the user through the input unit, with the expression portion and the color being associated with each other in the registering;
   highlighting each of (i) the registered expression portion and (ii) an expression portion equivalent to the registered expression portion, in the expression displayed on the expression display unit, with the color registered in the copy buffer in association with the registered expression portion;
   specifying, based on an operation by the user through the input unit, (i) the color registered in the copy buffer in association with the registered expression portion, and (ii) a paste position on the expression display unit; and
   pasting the registered expression portion, which is registered in the copy buffer in association with the specified color, on the specified paste position, and highlighting the pasted registered expression portion with the specified color;
   wherein the displayed expression includes the registered expression portion and a variable number connected with the registered expression portion by an equal sign; and
   wherein the method further comprises:
   registering the variable number connected with the registered expression portion by the equal sign in association with the registered expression portion as the specified range; and
   highlighting, in the displayed expression, the registered variable number with the color registered in association with the registered expression portion.

11. An expression display method for an expression input apparatus, the expression input apparatus comprising an expression display unit that displays an expression including an expression portion and a variable number connected with the expression portion by an equal sign, a copy buffer, and an input unit that receives an operation by a user, and the method comprising:
   registering, in the copy buffer, the expression portion and the variable number connected with the expression portion by the equal sign in the displayed expression, the expression portion and the variable number being registered in the copy buffer in association with a color;
   highlighting, in the expression displayed on the expression display unit, each of the expression portion and the variable number connected with the expression portion by the equal sign which are registered in the copy buffer by the registering, with the associated color registered in the copy buffer by the registering; and
   when the variable number highlighted by the highlighting control unit is operated by a user through the input unit, replacing the operated variable number with the corresponding expression portion, and highlighting the expression portion after the replacement on the expression display unit with the same color as the color associated with the corresponding variable number.

12. A non-transitory computer-readable storage medium having an expression input control program stored thereon, the program being executable by a computer including an expression display unit that displays an expression, a copy buffer, and an input unit that receives an operation by a user, and the program being executable to control the computer to function as units comprising:
   an expression-and-color registering unit that registers, in the copy buffer, (i) an expression portion specified by the user through the input unit as a range to be copied in the displayed expression and (ii) a color specified by the user through the input unit, with the expression portion and the color being associated with each other;
   an expression highlighting control unit that highlights each of (i) the registered expression portion and (ii) an expression portion equivalent to the registered expression portion, in the expression displayed on the expression display unit, with the color registered in the copy buffer association with the registered expression portion;
   a color-and-position specifying unit that, based on an operation by the user though the input unit, specifies (i)

the color registered in association with the registered expression portion, and (ii) a paste position on the expression display unit; and a pasting unit that pastes the registered expression portion, which is registered by the expression-and-color registering unit in association with the specified color, on the specified paste position, and highlights the pasted registered expression portion with the specified color;

wherein the expression displayed on the expression display unit includes the registered expression portion and a variable number connected with the registered expression portion by an equal sign; and wherein the program is executable to control the computer to function as further units comprising:

an expression-and-variable registering unit that registers the variable number connected with the registered expression portion by the equal sign in association with the registered expression portion as the specified range; and a variable highlighting control unit that highlights, in the expression displayed on the expression display unit, the registered variable number with the color registered by the expression-and-color registering unit in association with the registered expression portion.

13. A non-transitory computer-readable storage medium having an expression display control program stored thereon, the program being executable by a computer including an expression display unit that displays an expression including an expression portion and a variable number connected with the expression portion by an equal sign, a copy buffer, and an input unit that receives an operation by a user, and the program being executable to control the computer to function as units comprising:

a registering unit that registers, in the copy buffer, the expression portion and the variable number connected with the expression portion by the equal sign in the displayed expression, the expression portion and the variable number being registered in the copy buffer in association with a color;

an expression-and-variable highlighting control unit that highlights, in the expression displayed on the expression display unit, each of the expression portion and the variable number connected with the expression portion by the equal sign which are registered in the copy buffer by the registering unit, with the associated color registered in the copy buffer by the registering unit; and a replaced expression highlighting control unit that, when the variable number highlighted by the expression-and-variable highlighting control unit is operated by a user, replaces the operated variable number with the corresponding expression portion, and highlights the expression portion after the replacement on the expression display unit with the same color as the color associated with the corresponding variable number.

* * * * *